United States Patent [19]

Carter

[11] Patent Number: 5,787,175
[45] Date of Patent: Jul. 28, 1998

[54] METHOD AND APPARATUS FOR COLLABORATIVE DOCUMENT CONTROL

[75] Inventor: Stephen R. Carter, Spanish Fork, Utah

[73] Assignee: Novell, Inc., Provo, Utah

[21] Appl. No.: 547,054

[22] Filed: Oct. 23, 1995

[51] Int. Cl.$^6$ .................................................. H04L 9/00
[52] U.S. Cl. .................................. 380/25; 380/3; 380/23
[58] Field of Search .......................... 380/23, 25, 30, 380/3

[56] References Cited

U.S. PATENT DOCUMENTS

| | | | |
|---|---|---|---|
| 4,864,494 | 9/1989 | Kobus Jr. | 364/200 |
| 5,018,096 | 5/1991 | Aoyama | 364/900 |
| 5,073,933 | 12/1991 | Rosenthal | 380/25 |
| 5,224,067 | 6/1993 | Harada | 380/4 |
| 5,231,666 | 7/1993 | Matyas | 380/25 |
| 5,263,158 | 11/1993 | Janis | 395/600 |
| 5,265,221 | 11/1993 | Miller | 395/725 |
| 5,274,824 | 12/1993 | Howarth | 395/725 |
| 5,276,901 | 1/1994 | Howell et al. | 395/800 |
| 5,305,456 | 4/1994 | Boitana | 395/700 |
| 5,309,516 | 5/1994 | Takaragi et al. | 380/45 |
| 5,311,591 | 5/1994 | Fischer | 380/4 |
| 5,315,657 | 5/1994 | Abadi et al. | 380/25 |
| 5,319,705 | 6/1994 | Halter et al. | 380/4 |
| 5,325,434 | 6/1994 | Spaanderman et al. | 380/45 |
| 5,343,527 | 8/1994 | Moore | 380/4 |
| 5,355,474 | 10/1994 | Thuraisngham et al. | 395/600 |
| 5,369,702 | 11/1994 | Shanton | 380/4 |
| 5,369,707 | 11/1994 | Follendore III | 280/25 |
| 5,373,558 | 12/1994 | Chaum | 380/23 |
| 5,406,628 | 4/1995 | Beller et al. | 380/30 |
| 5,465,299 | 11/1995 | Matsumoto et al. | 380/23 |
| 5,659,616 | 8/1997 | Sudia | 380/23 |

OTHER PUBLICATIONS

"Going With the Flow", L. Radosevich, *Computerworld*, Apr. 10, 1995 pp. 87–97.

"The Lotus Notes™ Storage System", K. Moore, ACM SIGMOD Record, 1995, pp. 427–428.

"Electronic Document Distribution", N. Maxemchuk, *AT&T Technical Journal*, Sep./Oct. 1994, pp. 73–80.

Note regarding "Security in the Client/Server Environment (Document Authentication in Groupware and Workflow)", A. Bestougeff, Proceedings SECURICOM 94 12th Worldwide Congress on Computer and Communications Security and Protection, Jun. 1994, pp. 273–283, 348.

Note regarding "Information Systems Security and Fraud Prevention in Office Automation Systems", P. Stanley, *IFIP Transactions*, 1993, vol. A37, pp. 375–383.

"Interconnecting Domains with Heterogenous Key Distribution and Authentication Protocols", F. Piessens et al., 1993 IEEE Symposium on Research in Security and Privacy, pp. 66–79.

(List continued on next page.)

*Primary Examiner*—George M. Dombroske
*Assistant Examiner*—Paul D. Amrozowicz
*Attorney, Agent, or Firm*—Computer Law++

[57] ABSTRACT

A method and apparatus are disclosed for controlling collaborative access to a work group document by the users of a computer system. A combination of public-key cryptographic methods, symmetric cryptographic methods, and message digest generation methods are used. The document has a data portion and a prefix portion. A computer-implemented collaborative encryption method uses structures in the prefix portion to restrict access to the information stored in the data portion. Users who are currently members of a collaborative group can readily access the information, while users who are not currently members of the group cannot. Other structures in the prefix portion support collaborative signatures, such that members of the group can digitally sign a particular version of the data portion. These collaborative signatures can then be used to identify the signing member and to determine if changes in the data portion were made after the collaborative signature was linked to the document.

70 Claims, 10 Drawing Sheets

OTHER PUBLICATIONS

"A Logical Analysis of Authorized and Prohibited Information Flows", F. Cuppens, 1993 IEEE Symposium on Research in Security and Privacy, pp. 100–109.

"Internet Privacy Enhanced Mail", S. Kent, *Communications of the ACM*, Aug. 1993, vol. 36, No. 8, pp. 48–59.

"Lattice–Based Access Control Models", R. Sandhu et al., *Computer*, Nov. 1993, pp. 9–19.

"Authentication for Distributed Systems", T. Woo et al., *Computer*, Jan. 1992, pp. 39–51.

"Evolution of a Trusted B3 Window System Prototype", J. Epstein et al., 1992 IEEE Symposium on Research in Security and Privacy, pp. 226–239.

"An Optimal Solution to the Secure Reader–Writer Problem", G. Benson, 1992 IEEE Symposium on Research in Security and Privacy, pp. 251–258.

"A Case Study of CES: A Distributed Collaborative Editing System Implemented in Argus", I. Greif et al., *IEEE Transaction on Software Engineering*, Sep. 1992, vol. 18, No. 9, pp. 827–839.

"Common Crytographic Architecture Crytographic Application Programming Interface", D. Johnson et al., *IBM Systems Journal*, 1991, vol. 30, No. 2, pp. 130–149.

"Password Management", M. Bishop, 1991 IEEE Spring Compcon, pp. 167–169.

Note regarding "Towards Trusted Cut and Past in the X Window System", J. Picciotto, 1991 Proceedings Seventh Annual Computer Security Applications Conference, pp. 34–43.

"Naming and Grouping Privileges to Simplify Security Management in Large Databases", R. Baldwin, 1990 IEEE Symposium on Research in Security and Privacy, pp. 116–132.

"Encrypted Database Design: Specialized Approaches", N. Wagner et al., 1986 IEEE Symposium on Security and Privacy, pp. 148–153.

"A Randomized Protocol for Signing Contracts", S. Even et al., *Communications of the ACM*, Jun. 1995, vol. 28, No. 6, pp. 637–647.

"XCP: An Experimental Tool for Managing Cooperative Activity", S. Sluizer et al., 1985 ACM Computer Science Conference, pp. 251–258.

"Design of a Relational Schema for Database Dynamic Authorization Management", Fugini, *Computer Security*, 1985, pp. 17–25.

"Pass–Algorithms: A User Validation Scheme Based in Knowledge of Secret Algorithms", J. Haskett, *Computing Practices*, Aug. 1984, vol. 27, No. 8, pp. 777–781.

"Combatting Software Piracy by Encryption and Key Management", D. Albert et al., *Computer*, Apr. 1984, pp. 68–73.

"Security Management in Office Information Systems", M. Fugini et al., *Computer Security: A Global Challenge*, 1984, pp. 487–498.

"Access Control Models and Office Structures", G. Montini et al., *Computer Security: A Global Challenge*, 1984, pp. 473–485.

"Incorporating Access Control in Forms Systems", G. Yeo, *Computer Security: A Global Challenge*, 1984, pp. 169–188.

"On Authorization Systems with Grantor–Controlled Propagation of Privileges", E. Leiss, 1983 IEEE Spring Compcon, pp. 499–502.

"Crytographic Sealing for Information Secrecy and Authentication ", D. Gifford, *Communications of the ACM*, Apr. 1982, vol. 25, No. 4, pp. 274–286.

"The Design of a Crytography Based Secure File System", E. Gudes, *IEEE Transactions on Software Engineering*, Sep. 1980, vol. SE–6, No. 5, pp. 411–420.

"On and Authorization Mechanism", R. Fagin, *ACM Transactions on Database Systems*, Sep. 1978, vol. 3, No. 3, pp. 310–319.

NetVoyage® Corporation, "NetEnvelope™ Pushing the envelope on the net™", Jan. 1997, pp. 1–17.

"DCE web and Security Domains", no later than May 16, 1997.

Steve Lewontin, "The DCE–Web: Securing the Enterprise Web", Nov. 1995.

"Secure Web — Architecture", no later than May 16, 1997.

"Secure Web Architecture — Scalability", no later than May 16, 1997.

"DCE Web Security", no later than May 16, 1997.

Rich Salz, "Re: [Q]DCE RPC Encryption", Jul. 21, 1995.

"Distributed Component Object Model (DCOM) Binary Protocol", May 1996, Microsoft Corporation (1997).

"The search for DCOM", Microsoft Site Search Results, Microsoft Corporation (1997), no later than May 13, 1997.

METHOD AND APPARATUS FOR COLLABORATIVE DOCUMENT CONTROL

FIELD OF THE INVENTION

The present invention relates to a computer-implemented method and apparatus for controlling a work group document, and more particularly to methods which allow each member of a specified group to encrypt and/or decrypt a document or to digitally sign and/or authenticate the document by using a key that is unique to the member in question, and to methods which prevent access to the document by persons who are not currently members of the group.

TECHNICAL BACKGROUND OF THE INVENTION

People often work in teams or groups to solve a problem or to create a product. Work groups are common in corporate departments ranging from research and development to customer support. Groups work best when the contributions of each group member are encouraged, reviewed, and improved by other members through an exchange of views and experiences. In many cases, these contributions are captured in "work group documents," namely, documents that are created and/or maintained by the work group.

The interplay between group members can make the documents produced and maintained by the group superior to documents that are produced individually. For instance, a product design document produced by an engineer, a marketer, and a user working together is more likely to lead to a successful product than a design document produced by any one of those individuals working alone.

Moreover, some documents can be more efficiently maintained by a group than by any given individual. For instance, in some cases statistics on nationwide efforts would be maintained more efficiently by designating one knowledgeable person in each regional office to regularly update a networked spreadsheet than by sending copies of raw data to a central location for entry by someone who is unlikely to detect errors.

Although word processor documents and spreadsheets are perhaps the most common examples of work group documents, they are by no means the only examples. Work group documents may contain any combination of text, numbers, computer program source code, computer hardware schematics or layouts, database records, digitized audio, digitized video, digitized visual images, or other digital information. Work group documents will often be stored on magnetic or optical disks, but they may be stored in any medium capable of retaining digital information.

It is often desirable to give the members of a work group special responsibility and authority regarding the documents associated with the work group. In particular, various attempts have been made to impose secrecy controls on work group documents. Secrecy controls attempt to allow members of the work group to review and edit the document while preventing such access by others.

One approach to secrecy requires the presence of special-purpose control hardware before access to the work group document is allowed. Some systems deny access unless a user logs onto a designated workstation or terminal that is protected by physical security measures such as locked doors, alarm systems, and patrolling guards. Some systems also embed verification hardware in the designated workstation. Other systems allow access through regular workstations but require that the user physically connect a specific hardware circuit to the workstation's serial or parallel port before access is granted. Still other systems grant access only after verifying the user's identity by scanning an identity card or other distinguishing physical feature of the user.

Approaches that require the presence of special-purpose control hardware may provide a very high level of security. However, reliance on special-purpose control hardware to maintain secrecy also has significant drawbacks. A substantial lead time is often needed to manufacture or modify the necessary control hardware. Each piece of control hardware is often customized, which also adds to the overall cost of the system.

In addition, the control hardware is typically prepared by one or more people outside the desired work group, such as hardware technicians. This has the drawback that document access is not limited to those people who are expected to contribute directly to the document. Relying on people who contribute to the control hardware but not to the document decreases the security of the document and increases the complexity and cost of administering the secrecy controls.

Approaches that rely on use of a specific terminal or workstation are also undesirable for users that work more efficiently when they can log onto a network from any of several locations. For instance, users may have workstations located at home, in the field, in their own office, and in colleagues' offices. Requiring the user to travel to the specified terminal when another terminal is already available nearby reduces productivity and stunts creativity.

Other approaches to secrecy place an "active filter" between the computer system users and the computer system storage media that hold the work group documents. The active filter attempts to intercept every access to the storage media and to filter out unauthorized attempts. The filter receives a user's request to access information, compares the request with the user's access rights or capabilities, and then grants or denies the request accordingly.

Active filters may include trusted personnel, trusted software, or both. Trusted personnel may include system administrators and/or system operators. Trusted software may include secure operating system software and/or secure file system software.

Active filters have certain advantages. Unlike controls that rely on special-purpose hardware, active filters allow users to utilize any available terminal or workstation. Because they constantly monitor the system, system administrators and system operators may also detect attempted security breaches quickly enough to prevent them entirely or to limit their scope.

However, such reliance on system administrators and system operators for secrecy poses substantial risk. Like the reliance on hardware technicians in approaches based on special-purpose control hardware, the use of system personnel as filters makes secret documents accessible to people who would not otherwise have access to them. In effect, the system administrators and system operators become members of every work group. A security breach by a system administrator or a system operator may compromise the secrecy of every document in the system, not just the secrecy of a particular document or the secrecy of documents in a particular work group.

Reliance on secure operating system software or secure file system software also has disadvantages. The software merely controls access to the storage medium that holds the document. The document may therefore be accessed by using unauthorized low-level software that bypasses the operating system and file system software and accesses the storage medium directly. Many programmers have the skill to create such low-level software if standard, commercially available file system software and computer hardware are used.

Moreover, many existing computer systems do not presently utilize secure operating system or file system software capable of acting as an active filter. Switching existing systems over to such software would be extremely time-consuming, expensive, and difficult.

Another approach to secrecy provides each member of the work group with a "capability," which is an unforgeable ticket identifying the document and providing certain access rights to the document. Capabilities can be generated only by the system and cannot be copied. When a user presents the system with an appropriate capability, the system provides the user with the specified access to the document identified in the capability.

Although they have been used in some computer systems, capabilities have substantial drawbacks. They rely on trusted system operators and/or trusted operating system software, so they have the disadvantages of active filters described above.

The "access control list" is perhaps the most widely used form of secrecy control. Different computer systems configure access control lists differently, but in general system users are assigned to one or more groups by a system administrator and a list which matches groups with access rights is associated with documents in the computer system.

For instance, if a user belongs to a group specified in the access control list of a given document as having read and write access to the document, then the user will be given read and write access to the document by the computer system. If the user belongs to a group specified in the access control list of the document as having read access only, then the system will give the user read access but will deny write access to the document in question. In addition to the ability to limit reads and writes, access control lists may also control other rights, including the right to execute a file and the right to modify the access control list for a file.

Although they are widely used, access control lists have substantial drawbacks as tools for controlling the secrecy of work group documents. Access control lists rely both on a trusted system administrator and on trusted file system software to control access, so they have the disadvantages of active filters described above. A breach of security by the system administrator makes all documents vulnerable, and the restraints imposed by the operating system or file system software can be avoided by knowledgeable programmers.

Moreover, some computer systems, including some networks, maintain the access control lists in a single central location. Centralization makes management of the lists easier but also leaves the entire system vulnerable to failures at that central location. If the access control lists become unavailable because of a software or hardware problem, then all users (except perhaps the system administrator) are shut out of all protected work group documents until the problem is fixed.

Some computer systems use a combination of physical security, special-purpose control hardware, trusted system personnel, trusted system software, access control lists, and capabilities to restrict access to files of all types, including work group documents. However, these combinations include not only the respective advantages but also the respective drawbacks of their various components.

As a result, some work groups encrypt their documents. Encryption has several advantages over the other approaches to secrecy described above. A document which is encrypted with a "key" can be decrypted only with that key. The key is typically a sequence of letters and/or numbers similar to a password or an account number. In its encrypted form, the document cannot be understood. That is, access to the document's encrypted contents does not provide access to the information kept in the document. If the key is known only to members of the work group, then the information in the document is not available to an unauthorized hardware technician, system administrator, programmer, or any other person who does not know the key.

In addition, secure encryption and decryption can be performed by general-purpose computer hardware, so group members are not limited to a specific workstation or terminal. The higher costs and delays associated with special-purpose control hardware can also be avoided.

Nonetheless, existing encryption approaches do have certain limitations. Many approaches use encryption methods that are not secure or methods that are impractical. In addition, some approaches impose severe limits on changes in group membership.

Encryption methods may be insecure or impractical for various reasons. Some methods, such as simple substitution ciphers, can be rapidly cryptanalyzed by anyone with a desktop computer and a basic knowledge of cryptography. Other encryption methods require deeper knowledge and/or the application of significant computing resources such as a supercomputer or a network, but will also yield their secrets after some hours or days of effort.

The security of some encryption methods depends heavily on the steps of the method being kept secret. However, most such "hidden" methods are vulnerable to the efforts of experienced cryptanalysts even if the hidden steps are initially unknown. Hidden methods that work reasonably well are also difficult to generate, making it impractical to rely on hidden methods in situations where dozens or hundreds of different work groups must operate side-by-side using the same computing system. There are simply not enough working hidden methods to assign a different method to each work group.

In addition, it is not unusual for a work group to change size and membership over time, with some people being added and some being removed from membership. Relying on hidden encryption methods for secrecy makes it difficult to revoke the access powers of people who leave the group. As people leave they will carry their knowledge of the hidden method with them, thereby compromising the security of the group's documents.

Perhaps the most widely known secure encryption method is the Digital Encryption Standard ("DES"), also known as the Digital Encryption Algorithm ("DEA"). This encryption method is discussed in one of the leading reference works on encryption, *Applied Cryptography* by Bruce Schneier, ISBN 0-471-59756-2, John Wiley & Sons 1994 ("Schneier"). DES does not rely heavily on hidden method steps. Instead, DES relies on the extreme computational effort required to decrypt an encrypted document without knowing the key. Individual DES keys are easy to generate, and a large number of different keys can be generated, so DES can be used effectively even if many work groups share a computer system.

However, simply encrypting a work group document with DES does have the drawback that the key used to encrypt the document must be known to all members of the work group to allow them to decrypt and work on the document. When people leave the group it is therefore difficult to revoke their access powers because they carry their knowledge of the group's DES key(s) with them.

In theory, each key known to the leaving person could be rendered harmless by decrypting all of the group's documents that are presently encrypted with that "old" key and then re-encrypting those documents using one or more "new" keys that are known only to the remaining group members. But in practice such decryption and re-encryption would often be an expensive and time-consuming process. In addition, the "new" key must be distributed to all members of the working group. Key distribution methods are favored targets in attempts to breach the security of cryptographic methods. The difficulty of revoking access powers thus forces a choice between living with reduced security and severely limiting changes in group membership.

Thus, it would be an advancement in the art to provide a novel method and apparatus for controlling work group documents.

It would be an additional advancement to provide such a method and apparatus which do not require special-purpose work-stations or terminals.

It would also be an advancement to provide such a method and apparatus which limit access to work group documents to those people who are expected to contribute directly to the document.

It would be a further advancement to provide such a method and apparatus which operate effectively with existing computer operating system and file system software.

It would also be an advancement to provide such a method and apparatus which do not require a single centralized access control mechanism.

It would be a further advancement in the art to provide such a method and apparatus which employ encryption so that access to a document's contents does not provide access to the information within the document.

It would also be an advancement to provide such a method and apparatus in which the security of the encryption method used need not depend on the steps of the method being kept secret, but may arise instead from the enormous computational effort required to decrypt an encrypted document without the key.

It would be an additional advancement to provide such a method and apparatus with which access powers are readily revoked when people leave the work group, even though the work group documents are not re-encrypted with a new key and even though the people leaving the group retain their knowledge of the key(s) they used.

It would also be an advancement to provide such a method and apparatus which permit any given member of the work group to independently re-encrypt the document with a different key in order to foil unauthorized decryption attempts, without preventing authorized access to the document.

It would be a further advancement to provide such a method and apparatus which permit such independent re-encryptions without requiring the given member to distribute the new key to the other members of the work group.

It would be an additional advancement to provide such a method and apparatus which permit any given member of the work group to independently change the cryptographic method used for key generation in order to foil unauthorized decryption attempts, without preventing authorized access to the document.

Such a method and apparatus for collaborative document control are disclosed and claimed herein.

BRIEF SUMMARY OF THE INVENTION

The present invention provides a method for controlling collaborative access to a work group document by the users of a computer system. As configured according to the invention, the document has a data portion and a prefix portion. The invention provides a computer-implemented collaborative encryption method which uses structures in the prefix portion to restrict access to the information stored in the data portion. Users who are currently members of a collaborative group can readily access the information, while users who are not currently members of the group cannot.

Other structures in the prefix portion support collaborative signatures, such that members of the group can digitally sign a particular version of the data portion. These collaborative signatures can then be used to advantage in ways similar to conventional individual digital signatures. For instance, the collaborative signatures can be used to identify the signing member and to determine whether any changes were made in the data portion after the collaborative signature was linked to the document.

An important aspect of these prefix structures is their use of public-key cryptographic methods in combination with other methods. The present invention uses public-key cryptographic methods in a specific combination with symmetric cryptographic methods to control decryption of the data portion. The present invention likewise uses public-key cryptographic methods in a specific combination with message digest generation methods to control attribution of particular versions of the data portion.

Unlike conventional security methods, the present invention prevents access to the information rather than merely preventing access to the medium that holds the information. The present invention also readily prevents unauthorized access by users whose access rights have been revoked.

The present invention also covers related devices and articles for collaborative document control. The features and advantages of the present invention will become more fully apparent through the following description and appended claims taken in conjunction with the accompanying drawings.

BRIEF DESCRIPTION OF THE DRAWINGS

To illustrate the manner in which the advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference is now made to the Figures wherein like parts are referred to by like numerals.

General System Environment

The present invention relates to a method and apparatus for controlling collaborative access to a work group document by users of a computer system. The computer system may be a computer network, a stand-alone system such as an individual workstation or laptop computer, or a disconnectable mobile computer.

Figure 1:
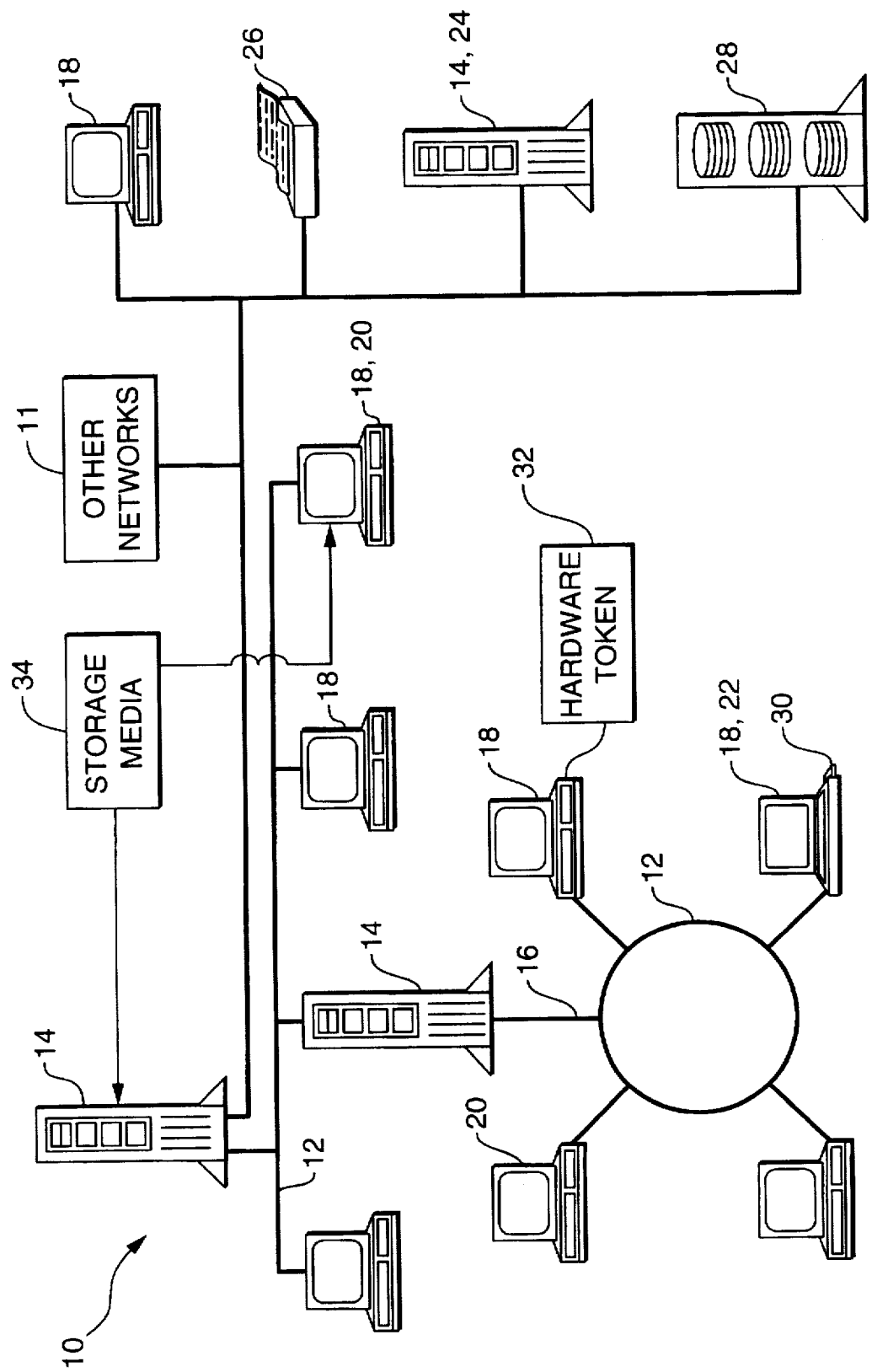
FIG. 1 is a schematic illustration of a computer network suitable for use with the present invention.

One of the many computer networks suited for use with the present invention is indicated generally at 10 in FIG. 1. In one embodiment, the network 10 includes Novell NetWare® network operating system software, version 4.x (NetWare is a registered trademark of Novell, Inc.). In alternative embodiments, the network includes NetWare Connect Services, VINES, Windows NT, LAN Manager, or LANtastic network operating system software (VINES is a trademark of Banyan Systems; NT and LAN Manager are trademarks of Microsoft Corporation; LANtastic is a trademark of Artisoft). The network 10 may be connectable to other networks 11 through a gateway or similar mechanism.

The network 10 includes several connected local networks 12. Each local network 12 includes a file server 14 that is connected by signal lines 16 to one or more clients 18. The clients 18 include personal computers 20, laptops 22, and workstations 24. The signal lines 16 typically include twisted pair, coaxial, or optical fiber cables, but may also include transmission means such as telephone lines, satellites, and microwave relays.

In addition to the client computers 18, a printer 26 and an array of disks 28 are also attached to the network 10. Other components may also be connected to one or more of the computer systems 10, 18, 20, 22, 24. For example, the laptop 22 is connected to a removable PCMCIA card 30. A removable hardware token 32 (such as a "dongle") is connected to a port of one of the clients 18. Although particular individual and network computer systems 10, 18, 20, 22, 24 are shown, those of skill in the art will recognize that the present invention also works with a variety of other computer systems.

The file servers 14 and the clients 18 are capable of using floppy drives, tape drives, optical drives or other means to read a storage medium 34. A suitable storage medium 34 includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system to operate in a specific and predefined manner as described herein. Thus, the medium 34 tangibly embodies a program, functions, and/or instructions that are executable by the file servers 14 and/or client computers 18 to perform collaborative document control steps of the present invention substantially as described herein.

Figure 2:
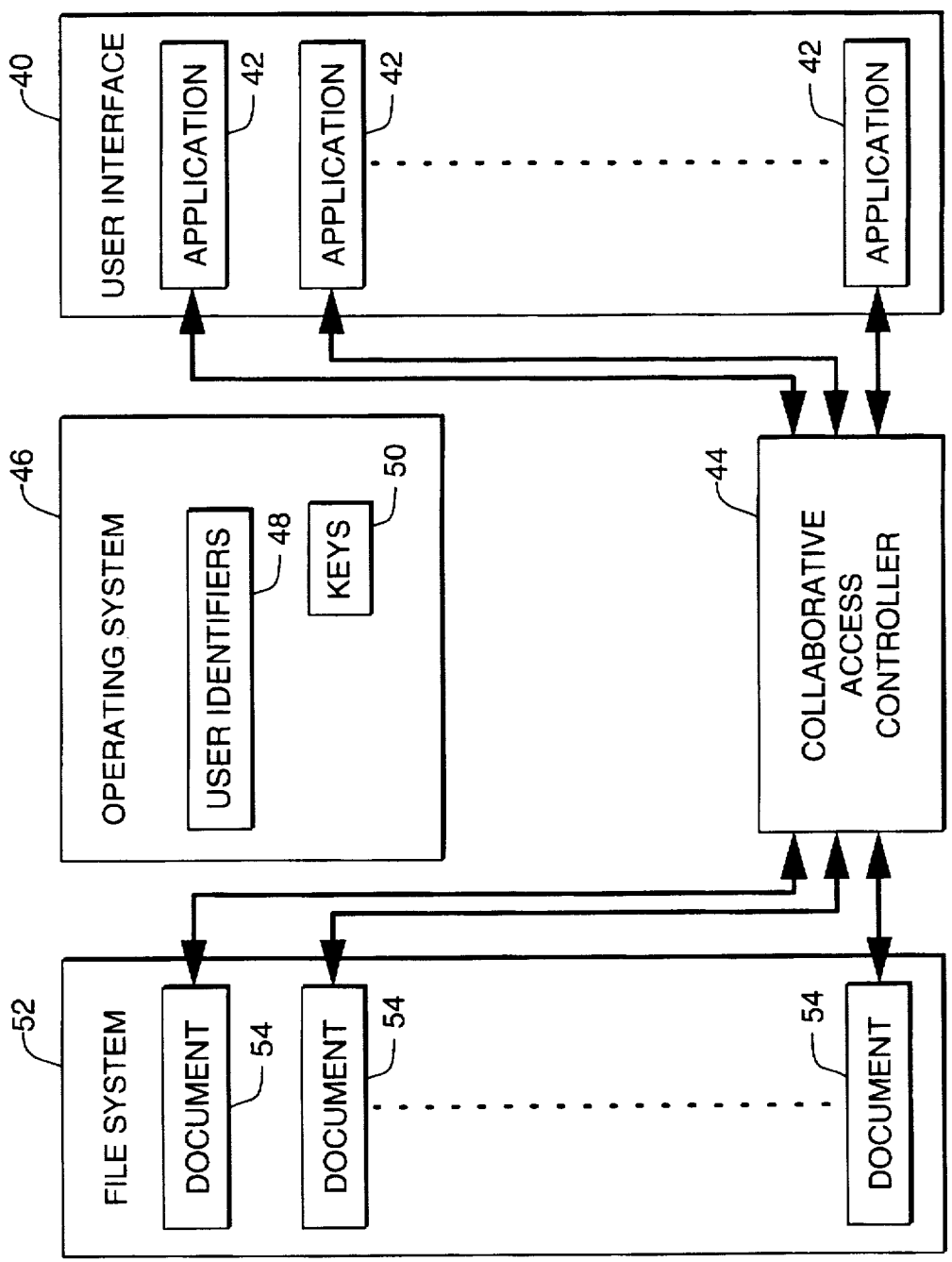
FIG. 2 is a diagram illustrating relationships between a collaborative access controller of the present invention and several components of a computer system.

One embodiment of a computer system according to the present invention is further illustrated in FIG. 2. Users of the computer system access and manipulate information with the aid of a user interface 40. Suitable user interfaces 40 include command line interpreters or shells such as those used in the UNIX environment, as well as desktops such as the Microsoft Windows 3.x or Windows 95 desktops (Microsoft, Windows, and Windows 95 are trademarks of Microsoft Corporation).

The user interface 40 is capable of launching one or more application programs 42 which are tailored to solve particular problems or manipulate particular types of data. An enormous variety of application programs 42 are known in the art, including without limitation word processors, spreadsheets, database managers, presentation managers, and program development tools. The application programs 42 may be configured to run on a single processor, on a multiprocessor, or on a distributed system such as the computer network 10 (FIG. 1).

The application programs 42 interface with a collaborative access controller 44 which performs access control steps in a manner described herein. Those of skill in the art will appreciate that implementations according to the present invention may place access controller 44 routines in .DLL files, in .EXE files, in OLE objects, and in other software components. The collaborative access controller 44 may be stored separately from the applications 42. Alternatively, some or all of the controller 44 may be linked into selected applications 42 at compile-time or at run-time. Those of skill will also appreciate that the controller 44 may be implemented in software, in hardware, or in a combination of software and hardware.

The collaborative access controller 44 interfaces with an operating system 46 which manages various resources of the computer system. Suitable operating systems 46 include those configured for stand-alone computer systems, such as the DOS, WINDOWS, WINDOWS 95, and MACINTOSH operating systems, as well as those configured for networks, such as the network operating systems identified above in connection with the network 10 (FIG. 1). (WINDOWS and WINDOWS 95 are trademarks of Microsoft Corporation; MACINTOSH is a registered trademark of Apple Computer, Inc.).

In some embodiments, the operating system 46 generates, maintains, and manages a set of user identifiers 48 such as login names or account numbers. User identifiers such as the identifiers 48 are commonly used to track resource use, to assist in verifying resource access rights, and to identify system users to one another. A login password is often, but not always, associated with each user identifier 48. Unless otherwise indicated, as used herein "password" includes both passwords and pass phrases.

Cryptographic Methods

In some embodiments, the operating system 46 also generates, maintains, and manages a set of keys 50. Some of the keys 50 are generated by symmetric cryptographic methods while others are generated by public-key cryptographic methods. It is presently preferred to utilize encryption methods whose strength does not depend heavily on the steps of the method being kept secret, but comes instead from the enormous computational effort required to decrypt an encrypted document without the key. Unless otherwise indicated, as used herein "encryption" includes both initial encryption and subsequent re-encryption.

One suitable symmetric cryptographic method is defined by the Data Encryption Standard (DES) described in the following National Bureau of Standards FIPS PUB publications which are incorporated herein by reference: 46, 74, 81, 112, and 113. DES and a variation known as triple-DES are described in pages 219–243 of Schneier, which are incorporated herein by reference. Other suitable symmetric cryptographic methods include LOKI91 (see pages 255–56 of Schneier), Khufu (see U.S. Pat. No. 5,003,597 incorporated herein by reference), IDEA (see U.S. Pat. No. 5,214,703, incorporated herein by reference), and other symmetric methods described in Schneier.

Suitable public-key cryptographic methods include the following: the RSA method described in U.S. Pat. No. 4,405,829; the Schnorr method described in U.S. Pat. No. 4,995,082; the Diffie-Hellman method described in U.S. Pat. No. 4,200,770; the ElGamal method described in pages 300–302 of Schneier; and the DSA method described in pages 304–314 of Schneier. Each of these descriptions of a public-key cryptographic method is incorporated herein by reference. Other suitable public-key cryptographic methods are also known in the art, including without limitation other methods described in Schneier. The cryptographic method (s) used may be implemented in software which executes on a general-purpose computer, in software which executes on a special-purpose computer, or in connection with the hardware token 32 or the PCMCIA card 30.

Documents Generally

With continued reference to FIG. 2, the collaborative access controller 44 also interfaces with a file system 52 which manages files containing documents 54 that are generated and manipulated using the computer system. Although documents 54 are typically generated and manipulated by users directly with one or more of the application programs 42, on some systems documents may also be generated and manipulated at times without direct user intervention. For instance, documents 54 may be collaboratively encrypted for use by a predetermined group of users without direct user intervention.

Those of skill will appreciate that a document 54 does not necessarily correspond to a file. Each document 54 maintained in the file system 52 may in practice be stored in a portion of a file which holds other documents 54, in a single file dedicated to the document 54 in question, or in a set of coordinated files.

Suitable file systems 52 include those configured for standalone computer systems, such as the various File Allocation Table file systems used in connection with the DOS operating system and the High Performance File System used in connection with the OS/2 operating system (OS/2 is a mark of International Business Machines Corporation). Suitable file systems 52 also include those configured for networks, such as the file systems used with the network operating systems identified above in connection with the network 10 (FIG. 1). The files are stored in one or more files on a magnetic drive, optical drive, or other storage medium.

Those of skill in the art will appreciate that functions provided by the operating system 46 in some embodiments are provided by the collaborative access controller 44 or by individual application programs 42 in other embodiments. Thus, the keys 50 and the identifiers 48 may be generated, maintained, and managed by the operating system 46, by the collaborative access controller 44, and/or by the individual application programs 42.

Network Environment

Figure 3:
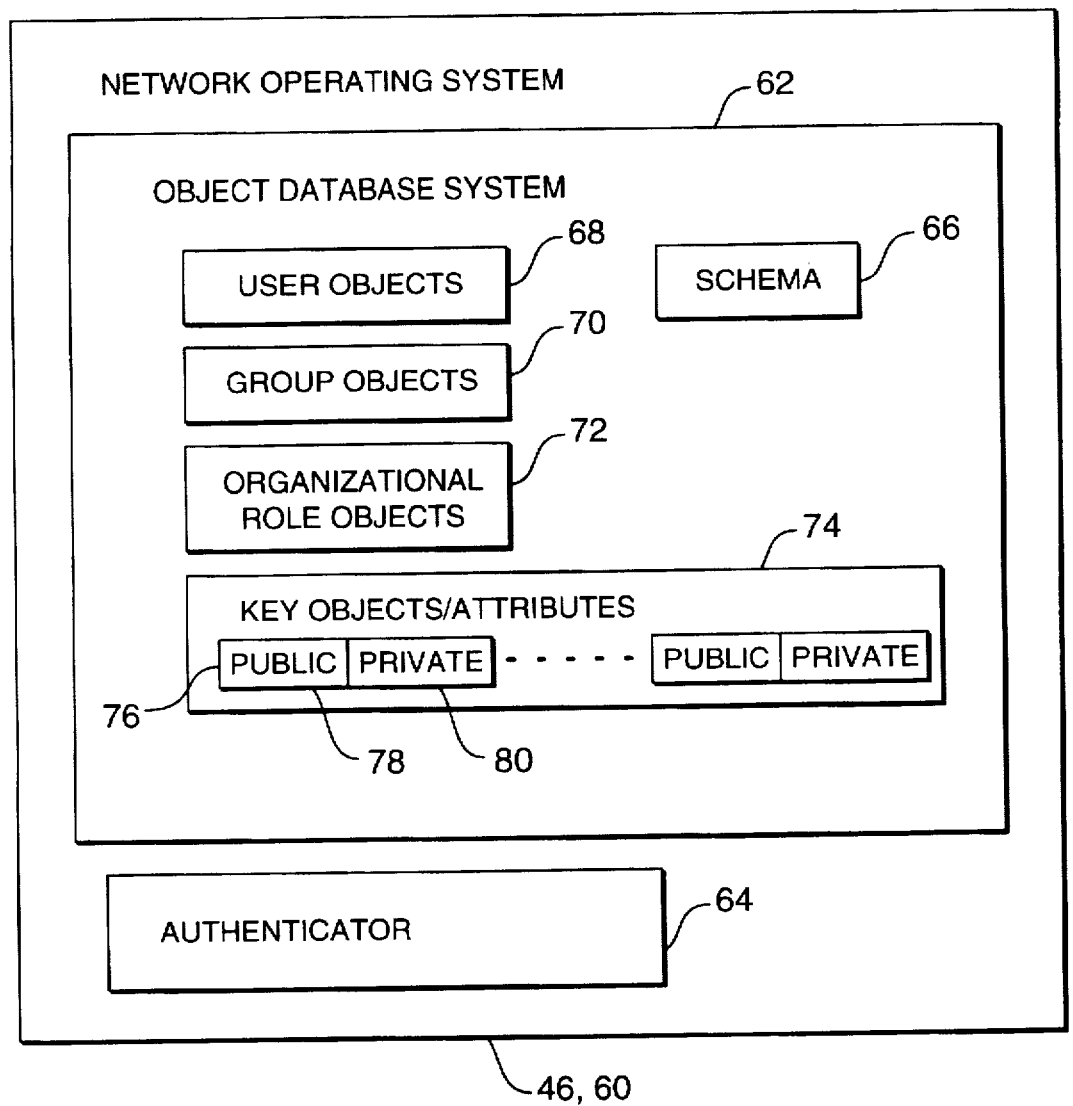
FIG. 3 is a diagram illustrating a network operating system suitable for use with the present invention.

FIG. 3 illustrates an embodiment of the present invention which utilizes a network operating system 60 as the operating system 46. In a presently preferred embodiment, the network operating system 60 comprises (a) the Novell NetWare® 4.x network operating system in combination with (b) an object database system 62 that comprises Novell's NetWare Directory Services software (NDS) and (c) an authenticator 64 that restricts access to the object database system 62. Suitable authenticators 64 include those used in the NetWare, Windows NT, LAN Manager, and VINES network operating systems.

The object database system 62 includes a schema 66 that defines a variety of objects 68, 70, 72, 74. More specifically, the schema 66 shown defines user objects 68, group objects 70, organizational role objects 72 and key objects/attributes 74. In alternative embodiments, the schema 66 omits definitions of group objects 70 and/or organizational role objects 72.

The schema 66 includes a set of "attribute syntax" definitions, a set of "attribute" definitions, and a set of "object class" (also known as "class") definitions. The NDS software and a default NDS schema 66 are described in chapters 6 through 8 of *NetWare 4 for Professionals* by Bierer et al. ("Bierer"). The terms "attribute" and "property" are used interchangeably in Bierer, as are the terms "attribute syntax" and "property syntax."

Each attribute syntax in the schema 66 is specified by an attribute syntax name and the kind and/or range of values that can be assigned to attributes of the given attribute syntax type. Attribute syntaxes thus correspond roughly to data types such as integer, float, string, or Boolean in conventional programming languages.

Each attribute in the schema 66 has certain information associated with it. Each attribute has an attribute name and an attribute syntax type. The attribute name identifies the attribute, while the attribute syntax limits the values that are assumed by the attribute. Each attribute may also have associated with it any or all of the following flags: Non-removable, Hidden, Public Read, Read Only, Single-Valued, Sized, and String. The general meanings of these flags are familiar to those of skill in the art. If the Sized flag is set for a given attribute, then upper and lower bounds (possibly including No Limit) are imposed on values currently held by that attribute.

Each object class in the schema 66 also has certain information associated with it. Each class has a name which identifies this class, a set of super classes that identifies the other classes from which this class inherits attributes, and a set of containment classes that identifies the classes permitted to contain instances of this class. Although the topics of class inheritance, containment, and instantiation are familiar to those of skill in the art, their use in connection with key objects/attributes 74 according to the present invention is new.

Each object class also has a container flag and an effective flag. The container flag indicates whether the class is a container class, that is, whether it is capable of containing instances of other classes. The effective flag indicates whether instances of the class can be defined. Non-effective classes are used only to define attributes that will be inherited by other classes, whereas effective classes are used to define inheritable attributes, to define instances, or to define both.

In addition, each object class groups together certain attributes. The naming attributes of a class are those attributes that can be used to name instances of the class. The mandatory attributes of a class are those attributes that must exist in each valid instance of the class and/or become mandatory attributes of classes which inherit from the class. The optional attributes of a class are those attributes that may, but need not, exist in each valid instance of the class. Optional attributes of a parent class become optional attributes of a child class which inherits from the parent class, unless the attributes are mandatory in some other parent class from which the child inherits, in which case they are also mandatory in the child.

An object is an instance of an object class. Different objects of the same class have the same mandatory attributes but may have different current values in their corresponding mandatory attributes. Different objects of the same class may have different optional attributes, and/or different current values in their corresponding optional attributes.

The NDS software includes an interface library which provides access to the schema 66 and to the database in the system 62. The schema 66 is an API-extensible schema in that the attributes and object classes found in the schema can be altered through an Application Programmers' Interface ("API") without direct access to the source code that implements the schema 66. In some embodiments the interface library includes tables or commands stored in a file which is read by the schema 66 during its initialization and when objects are created, thereby defining the available attributes and classes.

In addition or as an alternative, the interface library includes a set of routines that are available to other code to access and modify the schema 66. In one embodiment the interface library includes an API that defines an interface to an NWDSxxx( ) library which is commercially available from Novell, Inc. of Orem, Utah. The NWDSxxx( ) library is so named because the names of functions and data types defined in the library typically begin with "NWDS," an acronym for "NetWare Directory Services."

The database in the system 62 is a "hierarchical" database because the objects 68, 70, 72, 74 and their attributes in the database are connected in a hierarchical tree structure. Objects in the tree that can contain other objects are called "container objects" and must be instances of a container object class.

With reference to FIGS. 1 and 3, the database in the system 62 is also a "synchronized-partition" database. The database is typically divided into two or more non-overlapping partitions. To improve the response time to database queries and to provide fault-tolerance, a replica of each partition is physically stored on one or more file servers 14 in the network 10. The replicas of a given partition are regularly updated by the directory services software through an automated synchronization process, thereby reducing the differences between replicas caused by activity on the network 10.

An NWAdmin snap-in module may be used to modify the directory services schema 66 to support key objects/attributes 74 according to the present invention. NWAdmin is a commercially available extendable tool used by network administrators to manage objects and attributes in object databases.

In some embodiments, key pairs 76 are stored in key objects 74. In alternative embodiments, the key pairs 76 are stored in key attributes 74 which are then associated with user objects 68, with group objects 70, and/or with organizational role objects 72. Those of skill in the art will readily determine appropriate storage locations for the key pairs 76 in particular implementations of the present invention.

Each key pair 76 includes a public key 78 and a private key 80. The keys 78, 80 in any given pair 76 correspond to one another in operation as described herein. The public key 78 and the private key 80 are each generated by a given public-key cryptographic method. Suitable public-key cryptographic methods include those disclosed herein and other methods familiar to those of skill in the art.

Collaborative Documents

Figure 4:
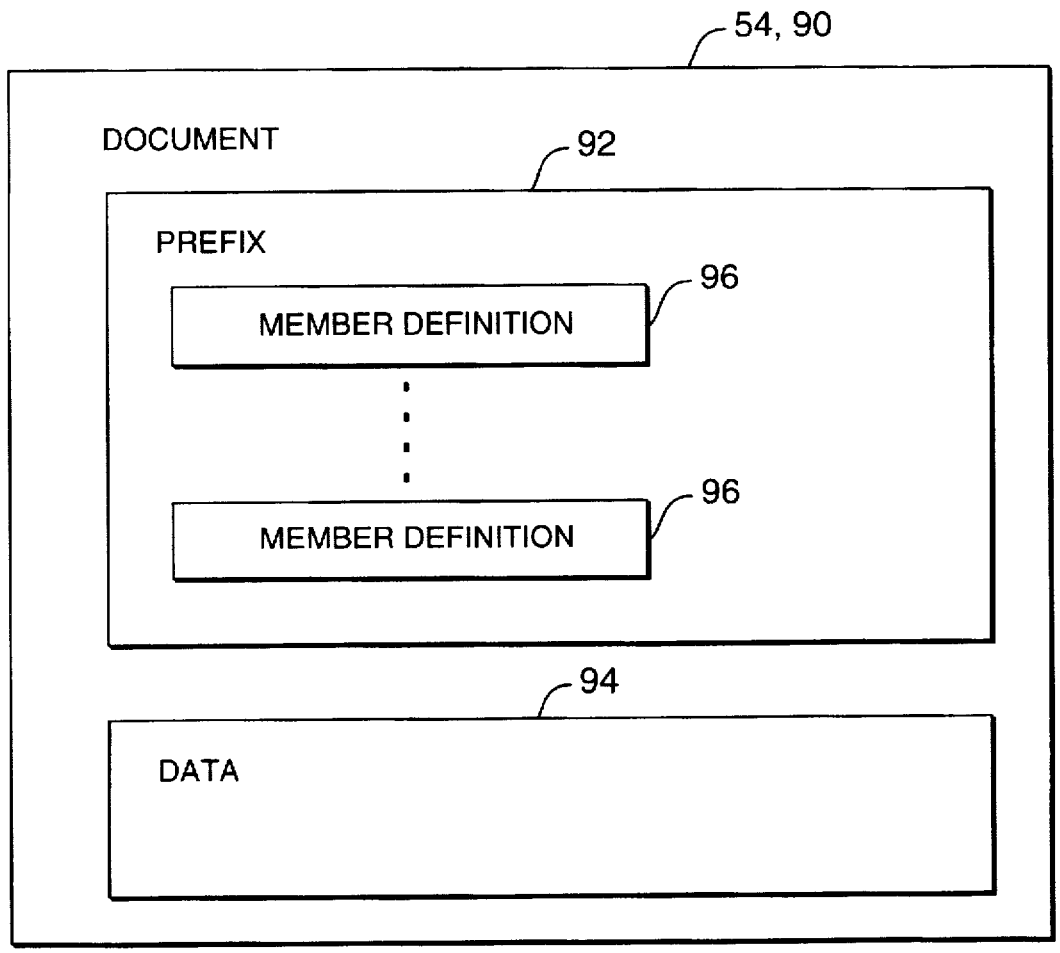
FIG. 4 is a diagram illustrating one embodiment of a work group document according to the present invention.

FIG. 4 illustrates a work group document 90, also known as "collaborative document 90," which is configured according to the present invention. The work group document 90 includes a prefix portion 92 and a data portion 94. The prefix portion 92 and the data portion 94 are each capable of being stored in at least one file in the computer system 10 (FIG. 1).

The term "prefix" does not limit the physical location of the prefix portion 92 of the document 90 but merely indicates a preferred location in embodiments which store the entire document 90 in a single file. That is, the information kept in the prefix portion 92 is preferably placed at the front of the file to promote efficient access to the prefix information in such embodiments. However, the prefix portion 92 may also be located in a separate file, at a separate location within the same file as the data portion 94, or even interleaved with parts of the data portion 94.

Figure 5:
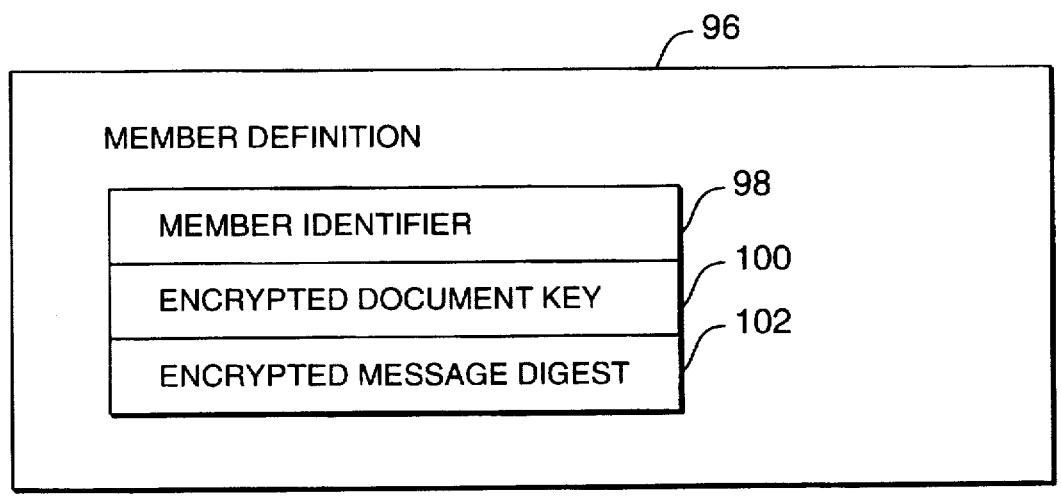
FIG. 5 is a diagram further illustrating a member definition that is linked to the document shown in FIG. 4.

With reference to FIGS. 4 and 5, the prefix portion 92 of the work group document 90 includes at least one member definition 96. The member definitions 96 may be located in the same file as the data portion 94 or in one or more separate files. As explained hereafter, the member definitions 96 define a collaborative group of computer system users which have access to the data portion 94 of the work group document 90.

Each member definition 96 includes a member identifier 98. Suitable member identifiers 98 include the user identifiers 48 (FIG. 2) used by the operating system 46, as well as identifiers defined exclusively for use in connection with work group document access according to the present invention. With reference to FIG. 3, one or more members of the collaborative group may correspond to an individual user object 68, to a group object 70, or to an organizational role object 72 that is recognized by the network operating system 60.

Each member definition 96 also includes an encrypted document key 100. Suitable encrypted document keys 100 include keys which are first generated by the symmetric or public-key cryptographic methods identified above and then encrypted by one of the public-key cryptographic methods.

The illustrated embodiment of the member definition 96 also includes an encrypted message digest 102. In a particular work group document 90, some of the member definitions may include an encrypted message digest 102 while others do not. The encrypted message digest 102 will be present (absent) if the member in question has collaboratively signed (has not signed) the document 90, as explained below.

Access Control Methods

Figure 9:
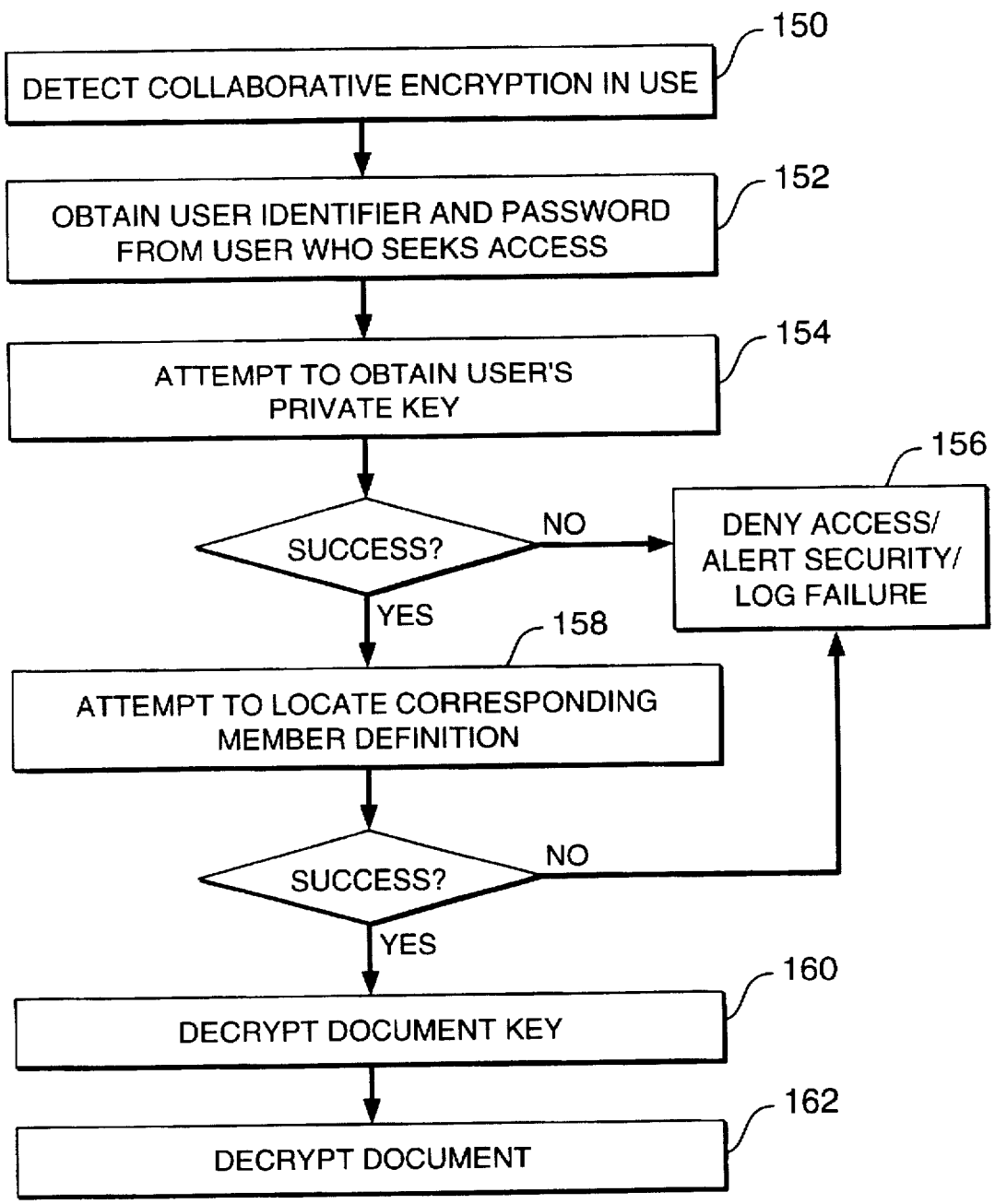
FIG. 9 is a flowchart illustrating a method of the present invention for restricting access to a collaboratively encrypted document.

FIGS. 4–9 illustrate one method according to the present invention for controlling collaborative access to the work group document 90. In particular, the method includes computer-implemented steps for collaboratively encrypting the document 90 (FIG. 6) and steps for restricting access to the data portion 94 of the collaboratively encrypted document (FIG. 9).

FIGS. 2–6 illustrate one method according to the present invention for collaboratively encrypting an arbitrary document 54 to produce a work group document 90. During a document-key-obtaining step 110, the collaborative access controller 44 obtains a document key which will be used to encrypt the contents of the data portion 94 of the document 54 during a subsequent encrypting step 112.

In one embodiment, the document key is one of the keys 50 that are generated by the operating system 46. In another embodiment, the document key is generated by the collaborative access controller 44 directly. In either case, the document key is preferably suitable for use with a symmetric cryptographic method to encrypt the data portion 94 of the document 54 during the encrypting step 112. Symmetric methods are preferred in the step 112 for their speed and their use of a single key rather than a key pair. However, in alternative embodiments the document key is suitable for use with a public-key cryptographic method during the encrypting step 112. Suitable cryptographic methods include those listed above and other methods that are familiar in the art.

During an identifying step 114, a collaborative group is identified by identifying one or more members of the group. Identification is accomplished by obtaining user identifiers 48 through dialog boxes or other interactive user interfaces, by identifying a group object 70 or other group identifier that is known to the operating system 46, or by other identification means familiar to those of skill in the art. In one embodiment, a default mechanism is employed whereby the user presently directing the collaborative access controller 44 is automatically identified as a member of the collaborative group.

During a member-key-obtaining step 116, the collaborative access controller 44 obtains one public key 78 for each collaborative group member. In some embodiments, the step 116 includes accessing the database system 62. In one of these embodiments, the collaborative access controller 44 submits one or more requests for public keys 78 to the authenticator 64, and the public keys 78 are supplied only after the requests are validated. Validation uses familiar techniques to verify that the source of the access request has sufficient access rights.

In another embodiment, the collaborative access controller 44 makes requests for public keys 78 directly to the object database system 62 without going through the authenticator 64. In alternative embodiments, the public key 78 is obtained from the operating system 46, the hardware token 32 (FIG. 1), or the PCMCIA card 30 without accessing the database system 62. Similar steps are employed to obtain private keys 80 during other steps described hereafter.

In a different embodiment, the public key 78 includes a certificate which can be used to validate the key 78. Version 1 certificates are described at page 426 of Schneier, which is incorporated herein by reference. Version 2 and version 3 certificates are also known in the art.

During a building step 118, the collaborative access controller 44 builds a member definition 96 for each member of the collaborative group. The components of each member definition 96 (illustrated in FIG. 5) are formed as follows. The member identifier 98 comprises the user identifier 48 which identifies the member to the operating system 46. The member identifier 98 optionally includes additional information which is either provided by the user during the identifying step 114 or extracted from the appropriate user object 68, such as the user's full name, telephone number, e-mail address, or department name.

The encrypted document key 100 is formed by encrypting the document key obtained during the step 110 with the public key of the member in question, which was obtained during the step 116. Note that the underlying document key is the same for each member of the collaborative group, but the encrypted form 100 of the document key is unique to each member. Those of skill in the art will appreciate, that the encrypted document key 100 can be decrypted only by using the private key 80 that corresponds to the public key 78 used to encrypt the document-key.

They will also appreciate that the present invention is not hampered by human interface factors which tend to make short document keys preferable. Because the document key of the present invention is generated and manipulated by an implementing program, the key may be arbitrarily long and random in nature, and thus much less vulnerable to attacks based on short document key lengths.

Figure 10:
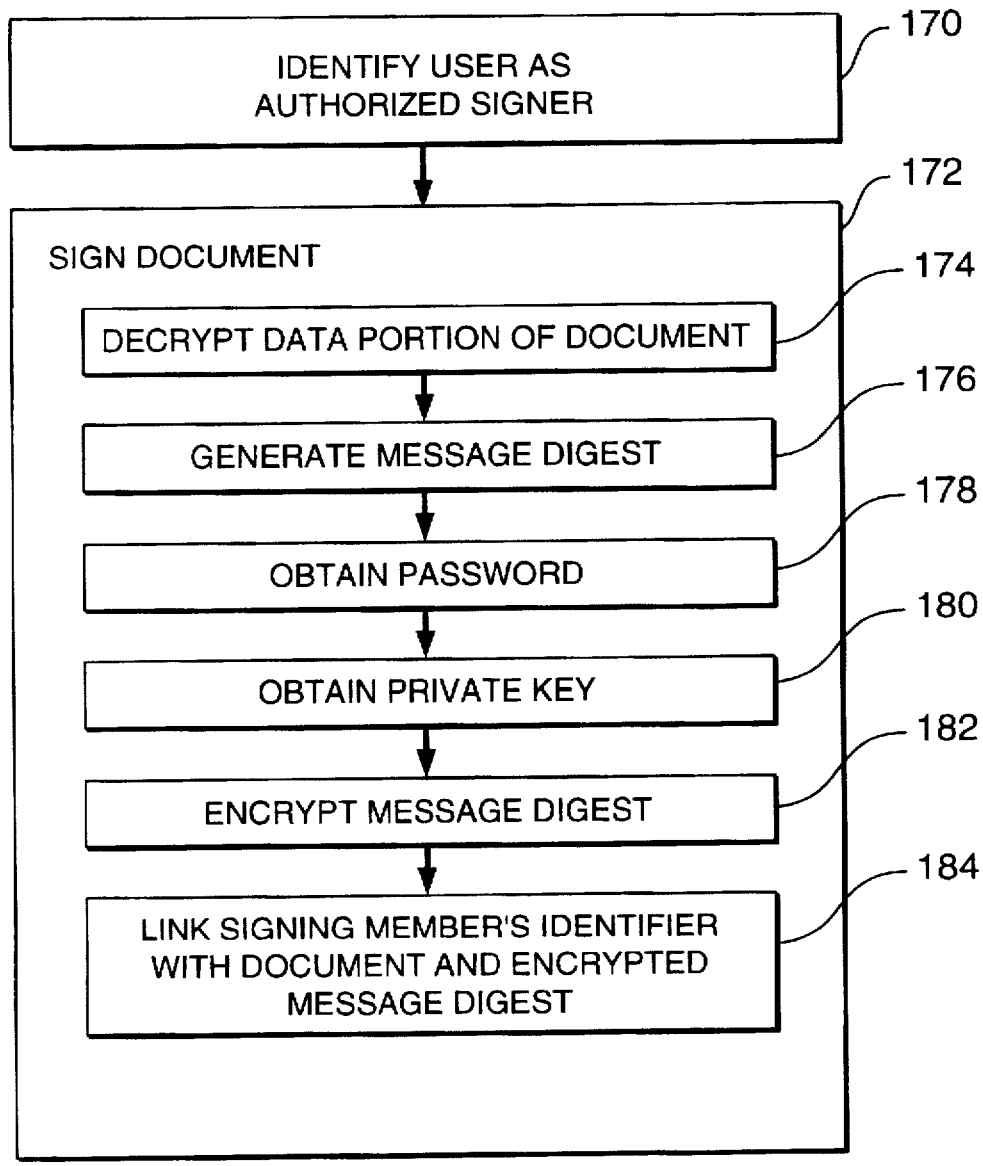
FIG. 10 is a flowchart illustrating a method of the present invention for collaboratively signing a document.

As noted, the member definition 96 includes the encrypted message digest 102 if the member in question has collaboratively signed the document 90. As explained in greater detail below in connection with FIG. 10, the encrypted message digest 102 is formed by generating a message digest based on the current contents of the data portion 94 of the document 90 and then encrypting that message digest with the private key 80 of the member who is signing the document 90. The message digest is also known as a "hash value."

The one or more member definitions 96 that were built during the step 118 are linked during a linking step 120. The member definitions 96 are linked with any pre-existing prefix portion 92 of the document 54 (that is, any prefix portion 92 which is separate from the member definitions 96) and with the encrypted form of the data portion 94 of the document 54, thereby transforming the document 54 into a work group document 90.

In one embodiment, linking is accomplished by storing the encrypted data portion 94 and the prefix portion 92 (including one or more member definitions 96) together in a file on a disk, tape, or other conventional storage medium.

In another embodiment, linking comprises storing the encrypted data portion 94 in one file and storing the prefix portion 92 (with member definitions 96) in separate files which are associated with one another. The association is created by a file naming convention, by listing the files in a data structure kept in one of the files, by listing the files in a data structure kept in the object database system 62, or by other means readily determined by those of skill in the art for associating files.

FIGS. 2–5 and 7 illustrate a method according to the present invention for adding a new member to the collaborative group of an existing collaborative document 90. During a verifying step 122, the collaborative access controller 44 verifies that the user requesting the addition of the new member is authorized to add new members. It is presently preferred that any current member of a collaborative group have authority to add or remove group members.

However, in one alternative embodiment, authorization to change group membership is granted only to the founding member who created the collaborative document. In another alternative embodiment, only the founding member is initially authorized to change group membership, but the founding member may delegate that authority to one or more other group members. Those of skill in the art will readily determine appropriate changes to the member definitions 96 and to the methods described herein to implement these alternatives.

In the preferred embodiment, according to which any current member of a collaborative group has authority change the membership of the group, the verifying step 122 includes searching the member definitions 96 in the prefix portion 92 of the work group document 90 in an attempt to locate a member identifier 98 that corresponds to the user who is requesting the change in group membership. If a corresponding member identifier 98 is found, the user is authorized to make the request. Otherwise, the user is not a member of the collaborative group and thus is not authorized to request changes in the membership of that group.

Figure 6:
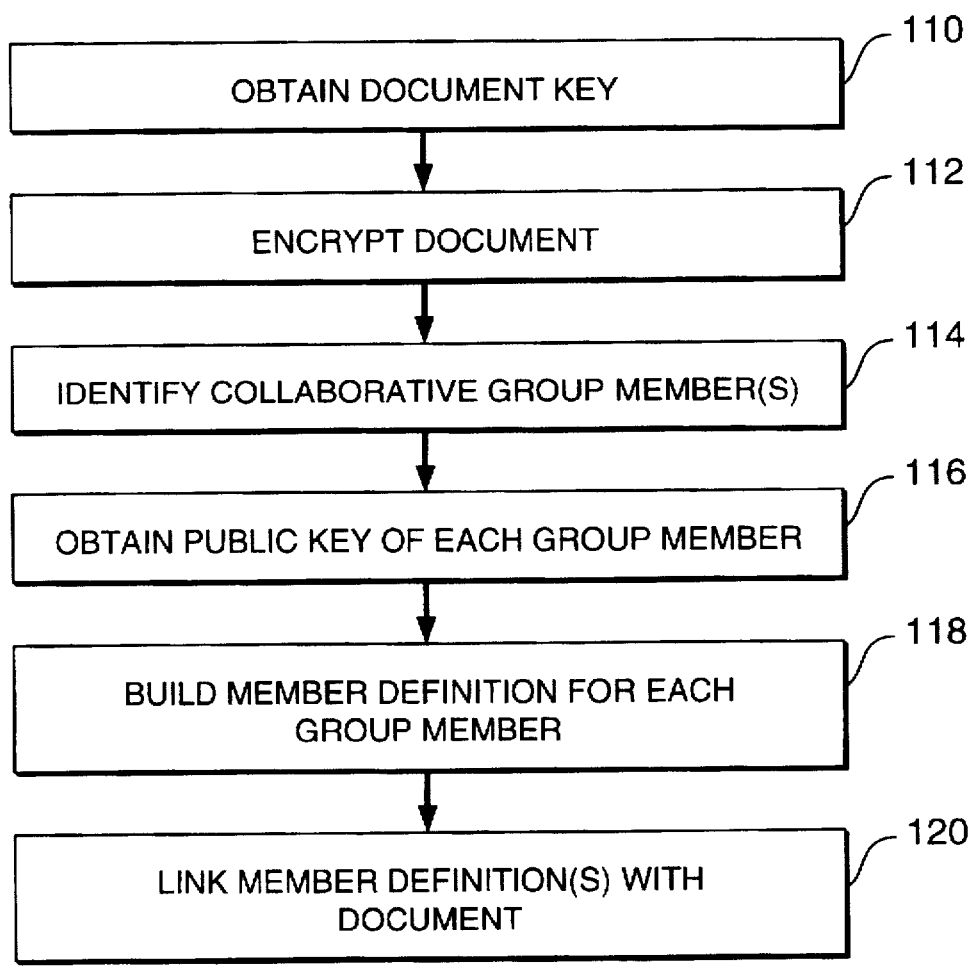
FIG. 6 is a flowchart illustrating a method of the present invention for collaboratively encrypting a document.
Figure 7:
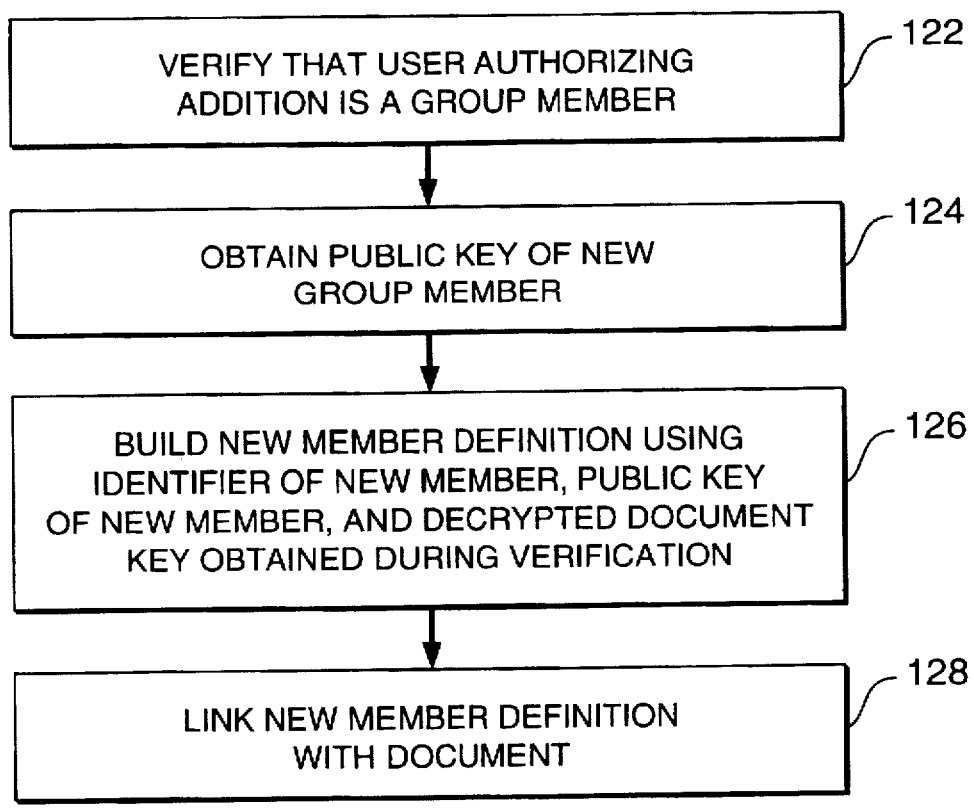
FIG. 7 is a flowchart illustrating a method of the present invention for adding a new member to a collaborative group.
Figure 8:
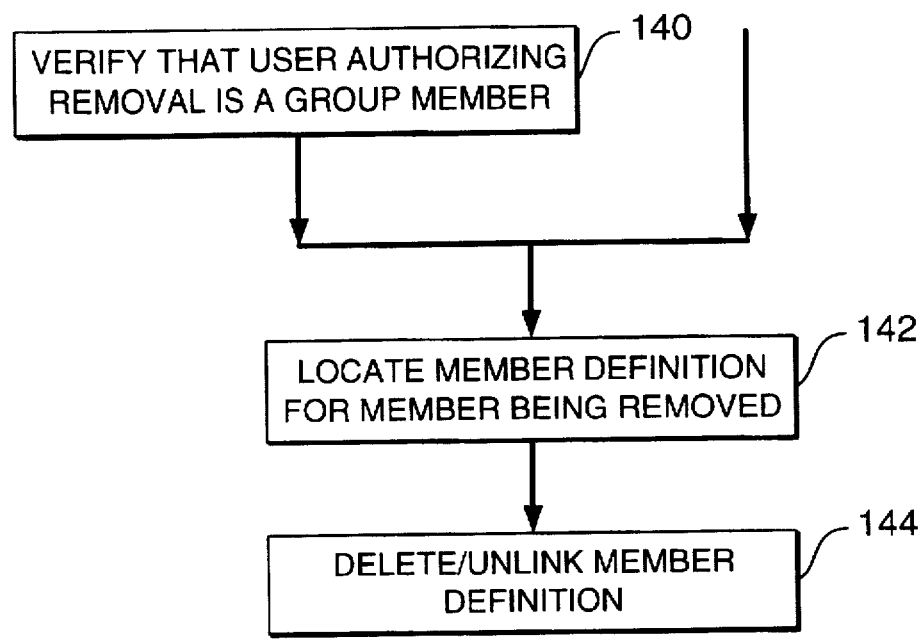
FIG. 8 is a flowchart illustrating a method of the present invention for removing a member from a collaborative group.

During an obtaining step 124, the collaborative access controller 44 obtains the public key 78 which corresponds to the user being added to the collaborative group. This is accomplished by any of the means and steps discussed above in connection with the member-key-obtaining step 116 (FIG. 6).

During a building step 126, a new member definition 96 is built. This is accomplished generally as discussed above in connection with the building step 118 (FIG. 6), with the following differences. The member identifier 98 of the new member definition 96 includes the user identifier 48 which identifies the new member to the operating system 46. The encrypted document key 100 is formed by obtaining the private key 80 of the member who authorized the addition in the step 122, decrypting that authorizing member's encrypted document key 100 to obtain the document key, and then encrypting the document key with the public key 78 of the new member. The new member definition 96 does not initially include an encrypted message digest 102. The encrypted message digest 102 will be added subsequently if the new member collaboratively signs the document 90.

During a linking step 128, the new member definition 96 is linked with the work group document 90. This is accomplished by any of the means and steps discussed above in connection with the linking step 120 (FIG. 6).

FIGS. 2–5 and 8 illustrate a method according to the present invention for removing a member from the collaborative group of an existing work group document 90. During an optional verifying step 140, the collaborative access controller 44 verifies that the user requesting the removal of the targeted member is authorized to remove members. As discussed above in connection with FIG. 7, it is presently preferred that any current member of a collaborative group have authority to add or remove group members, but alternative approaches to authorization are also disclosed.

In the preferred embodiment, according to which any current member of a collaborative group has authority to change the membership of the group, the verifying step 140 includes searching the member definitions 96 in the prefix portion 92 of the work group document 90 for a member identifier 98 that corresponds to the user who is requesting the change in group membership. If a corresponding member identifier 98 is found, the user is authorized to make the request. Otherwise, the user is not a member of the collaborative group and thus is not authorized to request changes in the membership of that group.

During a locating step 142, the collaborative access controller 44 searches the member definitions 96 in the prefix portion 92 of the work group document 90 for a member identifier 98 that corresponds to the targeted member. If a corresponding member identifier 98 is found, the targeted member is removed by a deleting step 144. If the search fails, the targeted "member" is not a member of the collaborative group and thus no change is made to the membership of that group. The deleting step 144 is accomplished by fully deleting the information in the targeted member definition 96.

FIGS. 2–6 and 9 illustrate a method according to the present invention for restricting access to the information in the data portion 94 of the work group document 90 so that members of the collaborative group have access and others do not. During a detecting step 150, the application 42 detects that the document 54 to which access is requested is a work group document 90. This is accomplished by tailoring the application 42 to recognize a flag in the document prefix 92, by a naming convention exhibited in the name of the file that contains the data portion 94, or by other means readily determined by those of skill in the art.

Alternatively, the application 42 may not be capable of distinguishing work group documents 90 from other documents 54. In this case, one of two events occurs. Either the application 42 fails to read the encrypted data portion 94 and displays an error message, or the application 42 reads the encrypted data portion 94 and displays encrypted data to the user. In either case, the user then recognizes that the document 54 is a work group document 90 and invokes the controller 44 beginning at an obtaining step 152.

After it has been determined that the document 54 to which access is requested is a work group document 90, the obtaining step 152 is performed by the collaborative access controller 44. As with other portions of the collaborative access controller 44, the portion which performs the obtaining step 152 may be embodied within the application 52 or may be a separate module which is invoked by the application 52 or by the user. The obtaining step 152 comprises interactively asking the user for its user identifier and a corresponding password. In alternative embodiments, the user identifier identifies the current user and is obtained by querying the operating system 46 or the object database system 62; only the password is obtained interactively from the user.

During a key-seeking step 154, the collaborative access controller 44 attempts to use the information provided during the step 152 to obtain the private key 80 of the identified user. This is accomplished by means and steps discussed above in connection with the steps 116, 124. If the attempt fails, then the user identifier obtained during the step 152 is not valid, or the password obtained is not valid for the identified user, or both of these conditions hold.

Accordingly, the collaborative access controller 44 performs a limiting step 156 to limit access to the information in the data portion 94 of the work group document 90. In one embodiment, the limiting step merely denies the user access by preventing decryption of the data portion 94. In other embodiments, decryption is prevented and additional steps are taken as well. One embodiment logs information about the failed attempt, such as the time, workstation, collaborative document name, user identifier, etc. Another embodiment uses e-mail, telephony, alarms, or other conventional means to notify security personnel of the failed attempt. A third embodiment both logs the information and notifies security.

If the key-seeking step 154 succeeds, a member-seeking step 158 is performed. The step 158 searches the member definitions 96 of the collaborative document 90 in an attempt to locate a member identifier 98 that corresponds to the user identifier obtained during the step 152. The search is accomplished substantially as described above in connection with the steps 122, 140, 142. If the search fails, then the user identifier does not identify a member of the collaborative group and the limiting step 156 is performed.

If the search succeeds, a key-decrypting step 160 is performed. The private key 80 obtained during the step 154 is used in a manner determined by the public-key cryptographic method used in the step 118 to decrypt the corresponding encrypted document key 100, thereby providing a usable copy of the document key. Those of skill will appreciate that copies of keys should be kept only as long as necessary, and should be kept in secure locations. Thus, the decrypted copy of the private key 80 obtained during the step 154 is preferably scrambled, overwritten, or otherwise destroyed from memory as soon as a usable copy of the document key is obtained.

During a data-decrypting step 162, this copy of the document key is then used in a manner determined by the symmetric or public-key cryptographic method used in the step 112 to decrypt the encrypted data portion 94 of the collaborative document 90, thereby providing the collaborative group member access to the information stored in the document 90.

In one embodiment, the copy of the document key used to decrypt the data portion 94 is then promptly scrambled or otherwise invalidated to prevent its unauthorized use. However, in another embodiment the copy is maintained intact in a secure location in case the member decides to modify the copy of the data portion 94 which is kept on disk or in other permanent storage. After modifications to the data portion 94 are made using the application 42, the data portion is re-encrypted by repeating the step 112 and stored. The copy of the document key obtained during the step 160 is promptly scrambled or otherwise destroyed after the data portion 94 is re-encrypted.

Alternatively, the key can be retrieved if needed. However, in situations which require high security, a new document key is preferably generated and the document 90 is re-encrypted with a new key after each editing session.

Attribution Control Methods

FIGS. 2–6 and 10 illustrate a method according to the present invention for collaboratively signing a document 90. Collaborative signatures control the attribution of a given version of the work group document 90 to one or more members of the collaborative group.

During one embodiment of an identifying step 170, collaborative group membership is verified. The user who indicates a desire to collaboratively sign the document 90 must be a member of the collaborative group which is defined by the member definition(s) 96 that are linked to the collaborative document 90. Accordingly, a search is made of the member definitions 96, as in the steps 158, 142, 140, 122. If the search fails, a limiting step such as the step 156 may be performed, or the collaborative access controller 44 may simply print a message refusing the request to sign.

Figure 11:
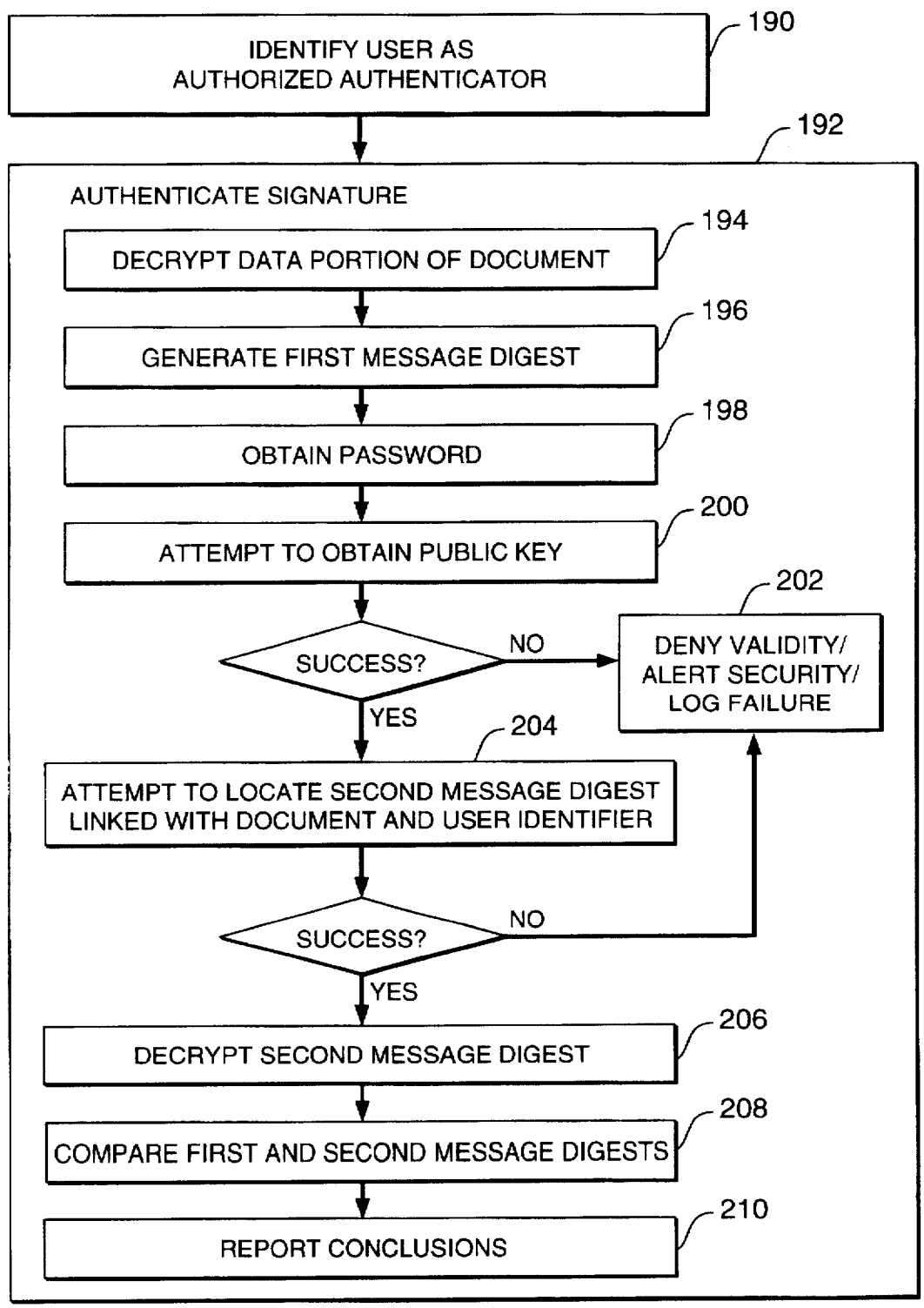
FIG. 11 is a flowchart illustrating a method of the present invention for authenticating a signature on a collaboratively signed document.

In an alternative embodiment, persons who are not members of the collaborative group are allowed to sign and to authenticate collaboratively encrypted documents. This is accomplished by omitting the step 174 of FIG. 10 and the step 194 of FIG. 11.

If the search succeeds, a signing step 172 is performed. Those of skill in the art will appreciate that the signing step 172, like many other steps of the present invention, may detect invalid user identifiers, keys, file names, or claims of group membership. The step 172 and the other steps described herein preferably react accordingly with invitations to re-enter the requested information, with error messages and early truncation of the step, or with limiting steps such as the step 156.

Each collaborative signature depends both on which member signs and on the contents of the data portion 94 at the time the member signed. Accordingly, a decrypting step 174 decrypts the data portion 94 if a decrypted and current copy of the data portion 94 is not already available as a result of the step 162. The step 174 is accomplished substantially in the manner described in connection with the step 162.

During a generating step 176, a message digest based on the decrypted data portion 94 is generated. In an alternative embodiment, the message digest is based on both the decrypted data portion 94 and on a current timestamp.

Suitable methods for generating timestamps are well-known in the art. Suitable methods for generating message digests include the MD5 method and the SHA method; descriptions of these methods based on Schneier are provided below. Both the MD5 method and the SHA method are known in the art, but their use in combination with the present invention is new. Other familiar methods for generating message digests may also be employed with the present invention.

The MD5 method proceeds generally as follows. The message text includes the decrypted data portion 94 alone or that data plus a timestamp. The message text is padded so that its length is 64 bits short of some multiple of 512. The padding includes a single one bit added to the end of the message, followed by as many zero bits as necessary. A 64-bit representation of the length of the unpadded text is appended to the padded text, thereby making the message length an exact multiple of 512 bits in length.

Next, four 32-bit "chaining variables" are initialized as follows:

```
A =   01  23  45  67
B =   89  AB  CD  EF
C =   FE  DC  BA  98
D =   76  54  32  10
```

The method then performs the following steps once for each 512-bit block in the message text. First, another variable AA receives a copy of the current value of A, BB gets the current value of B, CC gets C, and DD gets D. Then four groups of 16 operations each are performed. Each operation performs a nonlinear function on three of A, B, C, and D, and then adds that result to the fourth variable, to a sub-block of the text, and to a constant. The operation then rotates that result to the right a variable number of bits and adds the result to one of A, B, C, and D. The final result overwrites a different one of A, B, C, and D.

There are four nonlinear functions, one for each group of operations:

$$F1(X, Y, Z) = XY \text{ or (not } X)Z$$
$$F2(X, Y, Z) = XZ \text{ or } Y \text{ (not } Z)$$
$$F3(X, Y, Z) = X \text{ XOR } Y \text{ XOR } Z$$
$$F4(X, Y, Z) = Y \text{ XOR } (X \text{ or (not } Z))$$

These functions operate such that if the corresponding bits of X, Y, and Z are independent and unbiased, then each bit of the result of applying the function will also be independent and unbiased. Function F1 is the bit-wise conditional: If X then Y else Z. Function F3 is the bit-wise parity operator.

Let $M_j$ represent the jth sub-block of the message text, with j running from zero to 15, and let <<n represent a left shift of n bits. In step i, let $t_i$ be the integer part of $4294967296 \times abs(sin(i))$, where i is in radians. Note that 4294967296 is $2^{32}$. Then the four operations are:

```
alpha(x,y,z,w,Mj,n,ti):    x=y+((F1(y,z,w)+Mj+ti)<<n)
beta(x,y,z,w,Mj,n,ti):     x=y+((F2(y,z,w)+Mj+ti)<<n)
gamma(x,y,z,w,Mj,n,ti):    x=y+((F3(y,z,w)+Mj+ti)<<n)
delta(x,y,z,w,Mj,n,ti):    x=y+((F4(y,z,w)+Mj+ti)<<n)
```

The first group of operations is then:

```
alpha(A,B,C,D,M[0],7, 0xD76AA478)
alpha(D,A,B,C,M[1],12,0xE8C7B756)
alpha(C,D,A,B,M[2],17,0x242070DB)
alpha(B,C,D,A,M[3],22,0xCLBDCEEE)
alpha(A,B,C,D,M[4],7,0xF57C0FAF)
alpha(D,A,B,C,M[5],12,0x4787C62A)
```

-continued

```
alpha(C,D,A,B,M[6],17,0xA8304613)
alpha(B,C,D,A,M[7],22,0xFD469501)
alpha(A,B,C,D,M[8],7,0x698098D8)
alpha(D,A,B,C,M[9],12,0x8B44F7AF)
alpha(C,D,A,B,M[10],17,0xFFFF5BB1)
alpha(B,C,D,A,M[11],22,0X895CD7BE)
alpha(A,B,C,D,M[12],7,0x6B901122)
alpha(D,A,B,C,M[13],12,0xFD987193)
alpha(C,D,A,B,M[14],17,0xA6794388E)
alpha(B,C,D,A,M[15],22,0x49B40821)
```

The second group of operations is:

```
beta(A,B,C,D,M[1],5,0xF61E2562)
beta(D,A,B,C,M[6],9,0xC040B340)
beta(C,D,A,B,M[11],14,0x265E5A51)
beta(B,C,D,A,M[0],20,0xE9B6C7AA)
beta(A,B,C,D,M[5],5,0xD62F105D)
beta(D,A,B,C,M[10],9,0x02441453)
beta(C,D,A,B,M[15],14,0xD8A1E681)
beta(B,C,D,A,M[4],20,0xE7D3FBC8)
beta(A,B,C,D,M[9],5,0x21E1CDE6)
beta(D,A,B,C,M[14],9,0xC33707D6)
beta(C,D,A,B,M[3],14,0xF4D50D87)
beta(B,C,D,A,M[8],20,0x455A14ED)
beta(A,B,C,D,M[13],5,0xA9E3E905)
beta(D,A,B,C,M[2],9,0xFCEFA3F8)
beta(C,D,A,B,M[7],14,0x676F02D9)
beta(B,C,D,A,M[12],20,0x8D2A4C8A)
```

The third group of operations is:

```
gamma(A,B,C,D,M[5],4,0xFFFA3942)
gamma(D,A,B,C,M[8],11,0x8771F681)
gamma(C,D,A,B,M[11],16,0x6D9D6122)
gamma(B,C,D,A,M[14],23,0xFDE5380C)
gamma(A,B,C,D,M[1],4,0xA4BEEA44)
gamma(D,A,B,C,M[4],11,0x4BDECFA9)
gamma(C,D,A,B,M[7],16,0xF6BB4B60)
gamma(B,C,D,A,M[10],23,0xBEBFBC70)
gamma(A,B,C,D,M[13],4,0x289B7EC6)
gamma(D,A,B,C,M[0],11,0xEAA127FA)
gamma(C,D,A,B,M[3],16,0xD4EF3085)
gamma(B,C,D,A,M[6],23,0x04881D05)
gamma(A,B,C,D,M[9],4,0xD9D4D039)
gamma(D,A,B,C,M[12],11,0xE6DB99E5)
gamma(C,D,A,B,M[15],16,0x1FA27CF8)
gamma(B,C,D,A,M[2],23,0xC4AC5665)
```

The fourth group of operations is:

```
delta(A,B,C,D,M[0],6,0xF4292244)
delta(D,A,B,C,M[7],10,0x411AFF97)
delta(C,D,A,B,M[14],15,0xAB9423A7)
delta(B,C,D,A,M[5],21,0xFC93A039)
delta(A,B,C,D,M[12],6,0x655B59C3)
delta(D,A,B,C,M[3],10,0x8F0CCC92)
delta(C,D,A,B,M[10],15,0xFFEFF47D)
delta(B,C,D,A,M[1],21,0x85845DD1)
delta(A,B,C,D,M[8],6,0x6FA87E4F)
delta(D,A,B,C,M[15],10,0xFE2CE6E0)
delta(C,D,A,B,M[6],15,0xA3014314)
delta(B,C,D,A,M[13],21,0x4E0811A1)
delta(A,B,C,D,M[4],6,0xF7537E82)
delta(D,A,B,C,M[11],10,0xBD3AF235)
delta(C,D,A,B,M[2],15,0x2AD7D2BB)
delta(B,C,D,A,M[9],21,0xEB86D391)
```

After these four groups of operations are complete for a given 512-bit block, AA gets AA plus A, BB get BB plus B, CC gets CC plus C, and DD gets DD plus D. The method then repeats the four groups of operations and the updates for the next 512-bit block of data. The final output is the concatenation of A, B, C, and D, which is the 128-bit message digest.

The SHA method proceeds as follows. First, the message text is padded so that it is a multiple of 512 bits long. Padding is accomplished by the same method described with MD5. Five 32-bit variables are initialized:

```
A = 67 45 23 01
B = EF CD AB 89
C = 98 BA DC FE
D = 10 32 54 76
E = C3 D2 E1 F0
```

The method then begins processing the message text, one 512-bit block at a time. First the five variables are copied. AA get A, BB gets B, CC gets C, DD gets D, and EE gets E. Next, four groups of 20 steps each perform nonlinear operations on three of A, B, C, and D. Then shifting and adding are performed in manner similar to MD5.

SHA's nonlinear functions are as follows:

| | |
|---|---|
| (first 20 operations) | $f_t(X,Y,Z) = XY$ OR (NOT $X$)$Z$ |
| (second 20 operations) | $f_t(X,Y,Z) = X$ XOR $Y$ XOR $Z$ |
| (third 20 operations) | $f_t(X,Y,Z) = XY$ OR $XZ$ OR $YZ$ |
| (fourth 20 operations) | $f_t(X,Y,Z) = X$ XOR $Y$ XOR $Z$ |

Four constants are used:

$K_t$ = 5A827999, for the first 20 operations.
$K_t$ = 6ED9EBA1, for the second 20 operations.
$K_t$ = 8F1BBCDC, for the third 20 operations.
$K_t$ = CA62C1D1, for the fourth 20 operations.

The message block is transformed from sixteen 32-bit words ($M_0$ to $M_{15}$) to eighty 32-bit words ($W_0$ to $W_{79}$) using the following steps:

$W_t = M_t$ for t=0 to 15
$W_t = W_{t-3}$ XOR $W_{t-8}$ XOR $W_{t-14}$ XOR $W_{1-16}$, for t=16 to 79

If t is the operation number (from 1 to 80), $M_j$ represents the jth sub-block of the message (from 0 to 15), and <<n represents a left shift n bits, then the 80 operations look like:

```
TEMP = (A<<5)+f_t(B,C,D)+E+W_t+K_t
E = D
D = C
C = (B<<30)
B = A
A = TEMP
```

After this, A, B, C, D, and E are added to AA, BB, CC, DD, and EE, respectively, and the method continues with the next block of data. The final output is the concatenation of A, B, C, D, and E.

With continued reference to FIGS. 2–6 and 10, after the message digest is generated a password is obtained during a pass-obtaining step 178. The step 178 is accomplished substantially in accordance with the description of the step 152 above. The identifier of the signing member to whom the password corresponds is obtained substantially in accordance with the step 152 above.

During a key-obtaining step 180, the password is then used to obtain the private key 80 of the member who is signing the collaborative document 90. The step 180 is accomplished substantially in accordance with the description of the step 154 above.

Other Considerations

During an encrypting step 182, the private key 80 is then used to encrypt the message digest generated during the step 176. The encryption is accomplished in a manner determined by the public-key cryptographic method used to generate the private key 80. The private key 80 is promptly scrambled or otherwise invalidated after the digest is encrypted. The encrypted digest is copied to the encrypted message digest 100 in the member definition 96 whose member identifier 98 identifies the signing member. Finally, during a linking step 184, the updated member definition 96 is linked with the collaborative document 90. In some embodiments, the previously linked member definition 96 (see steps 120, 128) is updated in place and the step 184 is omitted.

Those of skill in the art will appreciate that the order of these steps may be varied. For instance, the pass-obtaining step 178 may be performed prior to or as part of the identifying step 170. Likewise, the pass-obtaining step 178 or both the pass-obtaining step 178 and the key-obtaining step 180 may precede the decrypting step 174 and/or the generating step 176. More generally, except in those cases in which keys, data, or other information produced in one step are utilized in a subsequent step, any of the steps of the methods described herein may be performed in any order relative to one another.

Those of skill will appreciate that preferred embodiments of the present invention report errors and other conditions which interfere with the invention as it assists users in controlling work group files. Suitable error reporting and recovery means are readily determined by those of skill in the art. Suitable techniques for diagnosing and debugging implementations of the present invention are likewise readily determined by those of skill in the art.

With reference to all Figures, articles of manufacture within the scope of the present invention include a computer-readable storage medium such as the medium 34 in combination with the specific physical configuration of a substrate of the computer-readable storage medium. The substrate configuration represents data and instructions, including without limitation the data structures and instructions illustrated and discussed in connection with the Figures, which cause one or more processors in the network 10 or individual computers 18–24 to operate in a specific and predefined manner to collaboratively encrypt, decrypt, sign, and/or authenticate work group documents as described herein. Suitable storage devices include floppy disks, hard disks, tape, CD-ROMs, RAM, and other media readable by a computer. Each such medium tangibly embodies a program, functions, and/or instructions that are executable by the processor to control collaborative documents according to the present invention substantially as described herein.

Summary

The present invention provides a novel method and apparatus for controlling work group documents. Although hardware tokens or PCMCIA cards may be used to generate or manage keys in connection with the present method, these devices are not required. Many embodiments of the method will run on general-purpose workstations or terminals, and will operate effectively with existing computer operating system, network operating system, and file system software.

Because the invention provides security through encryption and through the use of passwords that are each known only to an individual member of the collaborative group, the invention limits work group document access to those people who are expected to contribute directly to the document. Unlike conventional approaches, security breaches by a hardware technician or by system personnel are not substantial risks. Moreover, the risk of access by an unauthorized programmer is greatly reduced because access to a document's encrypted contents does not provide access to the information kept in the document.

A significant advantage of the present invention is the capability it provides for individual members of a work group to substitute different document keys and/or document key cryptographic methods for those currently being used, without requiring coordination with other group members or distribution of the new key.

Access powers are readily revoked when people leave the collaborative group, even though the work group documents are not re-encrypted with a new key and even though the people leaving the group retain their knowledge of the key(s) they used. The keys known to the members are their individual public keys, which are disabled when the member definition marks the member as removed or deleted. The document keys are not known to the members, but only to the software which implements the method.

Some embodiments of the present invention use NDS for public key management. Some embodiments use a collaborative access controller that is distributed throughout the applications. Each of these approaches helps free the invention from reliance on a single centralized access control mechanism.

Although particular apparatus and article embodiments of the present invention are expressly illustrated and described herein, it will be appreciated that additional and alternative apparatus and article embodiments may be formed according to methods of the present invention. Similarly, although particular method steps of the present invention are expressly described, those of skill in the art may readily determine additional and alternative steps in accordance with the apparatus and articles of the present invention. Unless otherwise expressly indicated, the description herein of methods of the present invention therefore extends to corresponding apparatus and articles, and the description of apparatus and articles of the present invention extends likewise to corresponding methods.

Section headings herein are for convenience only. The material under a given section heading is not necessarily the only material herein on that topic, nor is it necessarily limited only to material on that topic.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for controlling collaborative access to a work group document by users of a computer system, the document having a data portion and a prefix portion each portion capable of being stored in at least one file in the computer system, said method comprising the computer-implemented steps of collaboratively encrypting the document and restricting access to the data portion of the resulting collaboratively encrypted document.

2. A method for controlling collaborative access to a work group document by users of a computer system, the document having a data portion and a prefix portion, each portion capable of being stored in at least one file in the computer system, said method comprising the computer-implemented steps of collaboratively encrypting the document and restricting access to the data portion of the resulting collaboratively encrypted document, wherein said step of collaboratively encrypting the document comprises the steps of:

encrypting at least a portion of the document using a document key;

identifying a collaborative group which contains at least one member, each member having a corresponding member identifier;

obtaining a public key for each member of the collaborative group, each public key having a corresponding private key, the public and private keys being generated by a public-key cryptographic method; and linking each member identifier with a corresponding encrypted copy of the document key and with the document, each encrypted copy of the document key being created by using the public key of the member identified by the member identifier.

3. The method of claim 2, further comprising the step of adding a new member to the collaborative group.

4. The method of claim 2, further comprising the step of removing a member from the collaborative group.

5. The method of claim 2, wherein said encrypting step is preceded by the step of generating the document key.

6. The method of claim 5, wherein said generating step comprises generating a document key with a public-key cryptographic method.

7. The method of claim 5, wherein said generating step comprises generating a document key with a symmetric cryptographic method.

8. The method of claim 7, wherein the symmetric cryptographic method comprises a method selected from group consisting of the DES method, the triple-DES method, and the IDEA method.

9. The method of claim 2, wherein said linking step comprises storing the member identifiers and the corresponding encrypted copies of the document key in the same file as the data portion of the document.

10. The method of claim 2, wherein said linking step comprises storing the member identifiers and the corresponding encrypted copies of the document key in a location that is outside of any file that contains any part of the data portion of the document.

11. The method of claim 2, wherein at least one member of the collaborative group corresponds to an individual user object that is recognized by a network operating system.

12. The method of claim 2, wherein at least one member of the collaborative group corresponds to an organizational role object that is recognized by a network operating system.

13. The method of claim 2, wherein at least one member of the collaborative group corresponds to a group object that is recognized by a network operating system.

14. The method of claim 2, wherein said step of obtaining a public key comprises accessing a PCMCIA card.

15. The method of claim 2, wherein said step of obtaining a public key comprises accessing a database of public keys maintained on a computer network.

16. The method of claim 15, wherein said accessing step comprises authenticating an access request by verifying that the source of the access request has sufficient access rights.

17. The method of claim 16, wherein said verifying step is performed by a network operating system selected from the group consisting of the NetWare network operating system, the NetWare Connect Services operating system, the Windows NT network operating system, the LAN Manager network operating system, and the VINES network operating system.

18. The method of claim 15, wherein the database of public keys comprises a hierarchical synchronized-partition database maintained by a network operating system.

19. The method of claim 18, wherein the database comprises a NetWare Directory Services database.

20. The method of claim 2, wherein said step of obtaining a public key comprises generating a public key and generating a corresponding private key for at least one member of the collaborative group after said identifying step.

21. The method of claim 20, wherein the public-key cryptographic method comprises a method selected from the group consisting of the RSA method, the Schnorr method, the Diffie-Hellman method, the DSA method, and the ElGamal method.

22. A method for controlling collaborative access to a work group document by users of a computer system, the document having a data portion and a prefix portion, each portion capable of being stored in at least one file in the computer system, said method comprising the computer-implemented steps of collaboratively encrypting the document and restricting access to the data portion of the resulting collaboratively encrypted document, wherein said restricting step comprises the steps of:

detecting that the document has been collaboratively encrypted;

obtaining a member identifier and a corresponding password from the user; and attempting to use the password to obtain the private key of the member identified by the member identifier.

23. The method of claim 22, wherein said attempting step comprises accessing a hardware token connected to a computer in an attempt to obtain the private key.

24. The method of claim 22, wherein a private key is obtained by using the password, and said method further comprises the step of attempting to locate an encrypted copy of the document key which corresponds to the member identifier and which is linked to the document.

25. The method of claim 24, wherein such an encrypted copy of the document key is located, and said method further comprises the steps of decrypting the encrypted copy of the document key by using the private key and then decrypting the document by using the document key.

26. A method for controlling collaborative attribution of a work group document to users of a computer system, the document having a data portion capable of being stored in at least one file in the computer system, said method comprising the computer-implemented steps of:

identifying an authorized signer; and signing the document with a collaborative digital signature that is based at least in part on the data portion of the document and a key of the authorized signer.

27. The method of claim 26, wherein the authorized signer is a member of a collaborative group that was previously associated with the document, each member of the collaborative group having a pair of keys generated by a public-key cryptographic method.

28. The method of claim 26, further comprising the step of authenticating the collaborative digital signature.

29. The method of claim 28, wherein said authenticating step comprises verifying that an authorized signer identifier corresponding to the authorized signer is linked with the document.

30. The method of claim 29, wherein the authorized signer identifier is also linked with an encrypted copy of a document key that was used to encrypt the data portion of the document.

31. A method for controlling collaborative attribution of a work group document to users of a computer system, the document having a data portion capable of being stored in at least one file in the computer system, said method comprising the computer-implemented steps of identifying an authorized signer, and signing the document with a collaborative digital signature that is based at least in part on the data portion of the document and a key of the authorized signer, wherein said step of signing the document comprises the steps of:

generating a message digest based on the current contents of the data portion of the document;

obtaining a signer identifier and a corresponding password from a user, the signer identifier identifying a signer of the document;

using the password to obtain a private key of the signer from a hierarchical synchronized-partition database maintained by a network operating system, the private key and a corresponding public key being generated by a public-key cryptographic method;

encrypting the message digest with the private key; and linking together the signer identifier, the encrypted copy of the message digest, and the document.

32. The method of claim 31, wherein said generating step is preceded by the step of decrypting the data portion of the document.

33. The method of claim 31, wherein said generating step comprises the MD5 method of generating a message digest.

34. The method of claim 31, wherein said generating step comprises the SHA method of generating a message digest.

35. The method of claim 31, wherein said linking step comprises storing the signer identifier and the corresponding encrypted copy of the message digest in the same file as the data portion of the document.

36. The method of claim 31, wherein said linking step comprises storing the signer identifier and the corresponding encrypted copy of the message digest in a location that is outside of any file that contains any part of the data portion of the document.

37. The method of claim 31, wherein the public-key cryptographic method comprises the RSA method.

38. The method of claim 31, wherein the public-key cryptographic method comprises the DSA method.

39. The method of claim 31, wherein the message digest is based on the current contents of the data portion of the document and is also based on a timestamp.

40. The method of claim 28, wherein said authenticating step comprises the steps of:

generating a first message digest based on the current contents of the data portion of the document;

obtaining a signer identifier from a user; and attempting to use the signer identifier to obtain a corresponding public key from a hierarchical synchronized-partition database maintained by a network operating system, the public key and a corresponding private key being generated by a public-key cryptographic method.

41. The method of claim 40, wherein a public key is obtained, and said method further comprises the step of attempting to locate an encrypted copy of a second message digest which is linked with the document and with the signer identifier.

42. The method of claim 41, wherein such an encrypted copy of a second message digest is located, and said method further comprises the steps of:

using the private key to decrypt the encrypted copy and thereby obtain a plaintext copy of the second message digest; and comparing the first message digest and the plaintext copy of the second message digest to identify equivalent portions therein.

43. A computer-readable storage medium having a configuration that represents data and instructions which cause a processor to perform at least one method step for controlling collaborative access to a work group document by users of a computer system, the document having a data portion and a prefix portion, each portion capable of being stored in at least one file in the computer system, the method comprising the computer-implemented step of collaboratively encrypting the document.

44. A computer-readable storage medium having a configuration that represents data and instructions which cause a processor to perform at least one method step for controlling collaborative access to a work group document by users of a computer system, the document having a data portion and a prefix portion, each portion capable of being stored in at least one file in the computer system, the method comprising the computer-implemented step of collaboratively encrypting the document, wherein the step of collaboratively encrypting the document comprises the steps of:

encrypting a data portion of the document using a document key;

identifying a collaborative group which contains at least one member, each member having a corresponding member identifier;

obtaining a public key for each member of the collaborative group, each public key having a corresponding private key, the public and private keys being generated by a public-key cryptographic method; and linking each member identifier with a corresponding encrypted copy of the document key and with the document, each encrypted copy of the document key being created by using the public key of the member identified by the member identifier.

45. The storage medium of claim 44, wherein the method further comprises the step of adding a new member to the collaborative group.

46. The storage medium of claim 44, wherein the method further comprises the step of removing a member from the collaborative group.

47. The storage medium of claim 44, wherein the encrypting step is preceded by the step of generating the document key.

48. The storage medium of claim 44, wherein the linking step comprises storing the member identifiers and the corresponding encrypted copies of the document key in the same file as the data portion of the document.

49. The storage medium of claim 44, wherein at least one member of the collaborative group corresponds to an object that is recognized by a network operating system.

50. The storage medium of claim 44, wherein the step of obtaining a public key comprises accessing a database of public keys maintained on a computer network.

51. The storage medium of claim 50, wherein the database of public keys comprises a hierarchical synchronized-partition database maintained by a network operating system.

52. A computer-readable storage medium having a configuration that represents data and instructions which cause a processor to perform at least one method step for controlling collaborative access to a work group document by users of a computer system, the document having a data portion capable of being stored in at least one file in the computer system, the method comprising the computer-implemented step of collaboratively encrypting the document, wherein the method further comprises the step of restricting access to the data portion of the resulting collaboratively encrypted document.

53. The storage medium of claim 52, wherein the restricting step comprises the steps of:

detecting that the document has been collaboratively encrypted;

obtaining a member identifier and a corresponding password from the user; and attempting to use the password to obtain the private key of the member identified by the member identifier.

54. The storage medium of claim 53, wherein the attempting step comprises accessing a hardware token connected to a computer in an attempt to obtain the private key.

55. The storage medium of claim 53, wherein a private key is obtained by using the password, and the method further comprises the step of attempting to locate an encrypted copy of the document key which corresponds to the member identifier and which is linked to the document.

56. The storage medium of claim 55, wherein such an encrypted copy of the document key is located, and the method further comprises the steps of decrypting the encrypted copy of the document key by using the private key and then decrypting the document by using the document key.

57. A computer-readable storage medium having a configuration that represents data and instructions which cause a processor to perform at least one method step for controlling collaborative attribution of a work group document to users of a computer system, the document having a data portion capable of being stored in at least one file in the computer system, the method comprising the computer-implemented steps of:

identifying an authorized signer; and signing the document with a collaborative digital signature that is based at least in part on the data portion of the document and a key of the authorized signer.

58. The storage medium of claim 57, wherein the authorized signer is a member of a collaborative group that was previously associated with the document, each member of the collaborative group having a pair of keys generated by a public-key cryptographic method.

59. The storage medium of claim 57, wherein the method further comprises the step of authenticating the collaborative digital signature.

60. The storage medium of claim 59, wherein the authenticating step comprises verifying that a member identifier corresponding to the member is linked with the document.

61. The storage medium of claim 60, wherein the authorized signer identifier is also linked with an encrypted copy of a document key that was used to encrypt the data portion of the document.

62. A computer-readable storage medium having a configuration that represents data and instructions which cause a processor to perform at least one method step for controlling collaborative attribution of a work group document to users of a computer system, the document having a data portion capable of being stored in at least one file in the computer system, the method comprising the computer-implemented steps of identifying an authorized signer, and signing the document with a collaborative digital signature that is based at least in part on the data portion of the document and a key of the authorized signer, wherein the step of signing the document comprises the steps of:

generating a message digest based on the current contents of the data portion of the document;

obtaining a signer identifier and a corresponding password from a user, the signer identifier identifying a signer of the document;

using the password to obtain a private key of the signer from a hierarchical synchronized-partition database maintained by a network operating system, the private key and a corresponding public key being generated by a public-key cryptographic method;

encrypting the message digest with the private key; and linking together the signer identifier, the encrypted copy of the message digest, and the document.

63. The storage medium of claim 62, wherein the generating step is preceded by the step of decrypting the data portion of the document.

64. The storage medium of claim 62, wherein the generating step comprises a method of generating a message digest selected from the group consisting of the MD5 method and the SHA method.

65. The storage medium of claim 62, wherein the linking step comprises storing the signer identifier and the corresponding encrypted copy of the message digest in the same file as the data portion of the document.

66. The storage medium of claim 62, wherein the public-key cryptographic method comprises a method selected from the group consisting of the RSA method and the DSA method.

67. The storage medium of claim 62, wherein the message digest is based on the current contents of the data portion of the document and is also based on a timestamp.

68. The storage medium of claim 59, wherein the authenticating step comprises the steps of:

generating a first message digest based on the current contents of the data portion of the document;

obtaining a signer identifier from a user; and attempting to use the signer identifier to obtain a corresponding public key from a hierarchical synchronized-partition database maintained by a network operating system, the public key and a corresponding private key being generated by a public-key cryptographic method.

69. The storage medium of claim 68, wherein a public key is obtained, and the method further comprises the step of attempting to locate an encrypted copy of a second message digest which is linked with the document and with the signer identifier.

70. The storage medium of claim 69, wherein such an encrypted copy of a second message digest is located, and the method further comprises the steps of:

using the private key to decrypt the encrypted copy and thereby obtain a plaintext copy of the second message digest; and comparing the first message digest and the plaintext copy of the second message digest to identify equivalent portions therein.

\* \* \* \* \*